Feb. 22, 1966 KAICHIRO YOSHIDA ETAL 3,236,466
AUTOMATIC WINDER
Filed Nov. 27, 1962
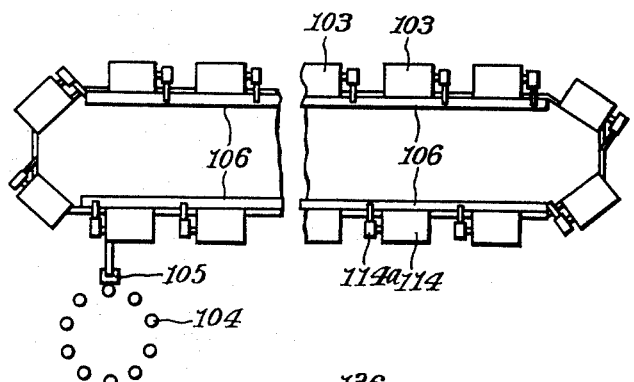
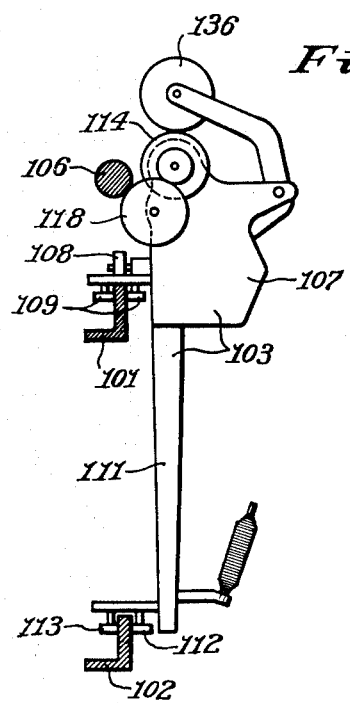

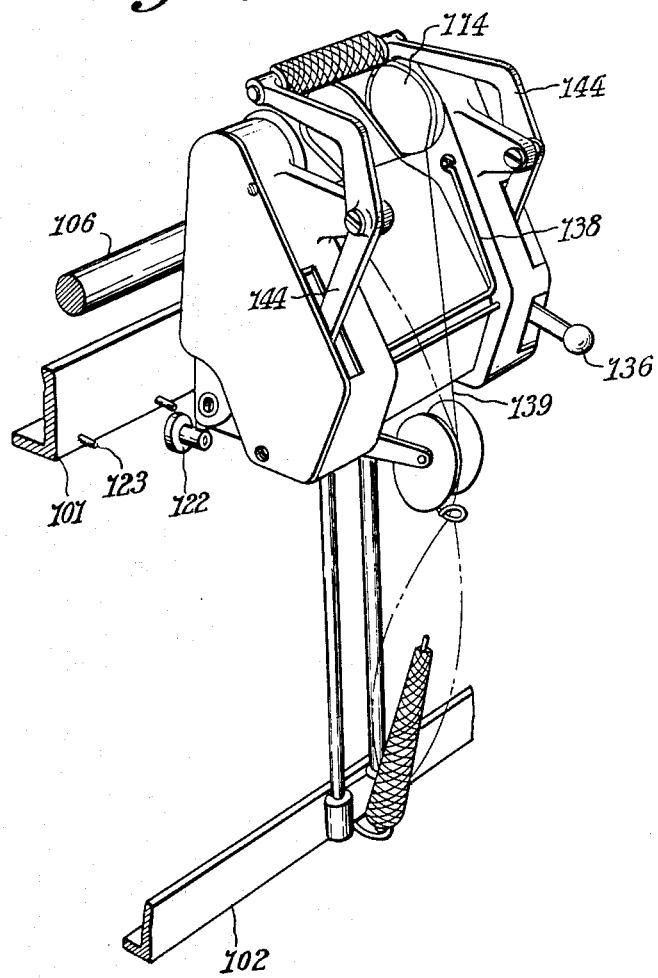

Feb. 22, 1966  KAICHIRO YOSHIDA ETAL  3,236,466
AUTOMATIC WINDER
Filed Nov. 27, 1962  27 Sheets-Sheet 3
Fig-4-
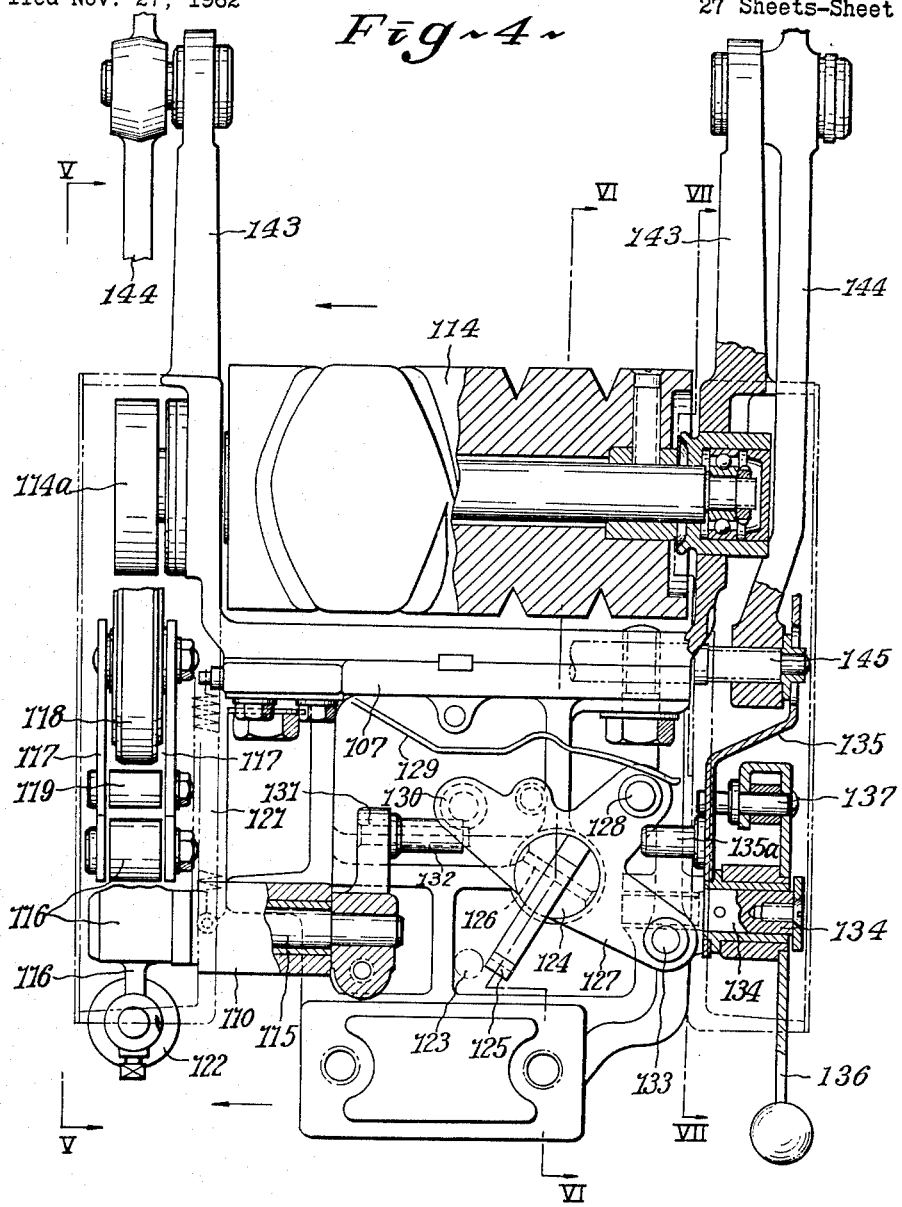

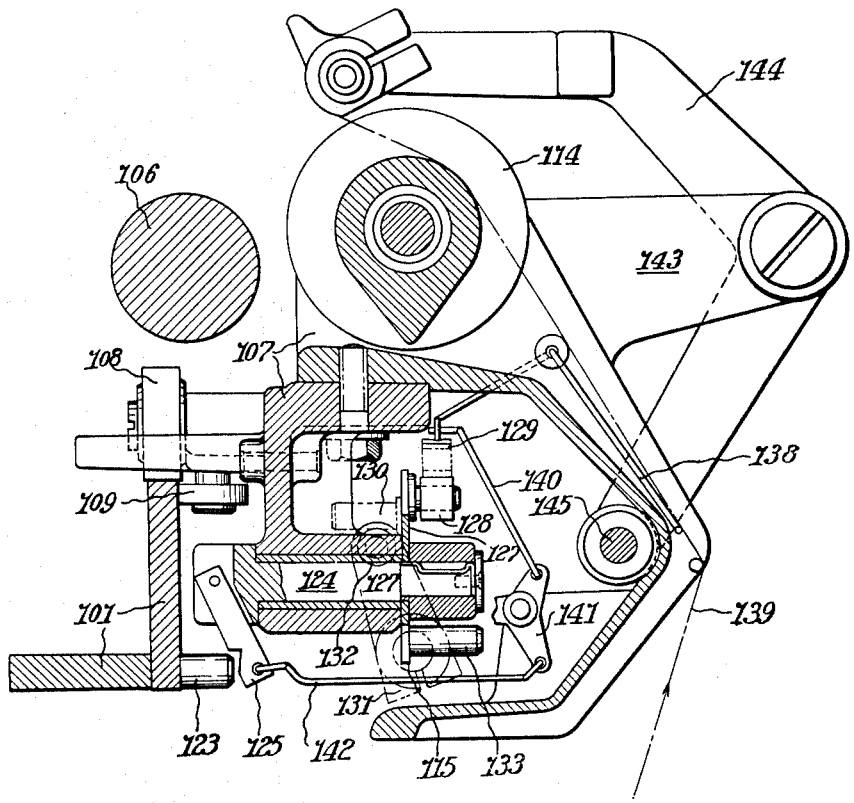

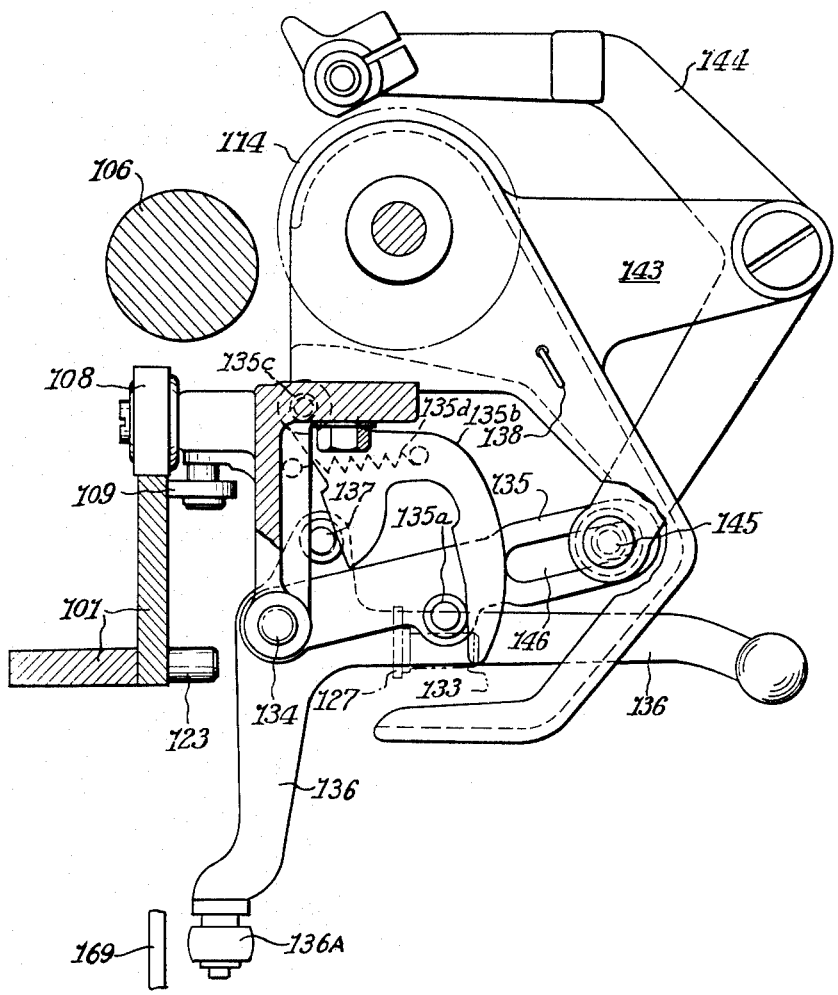

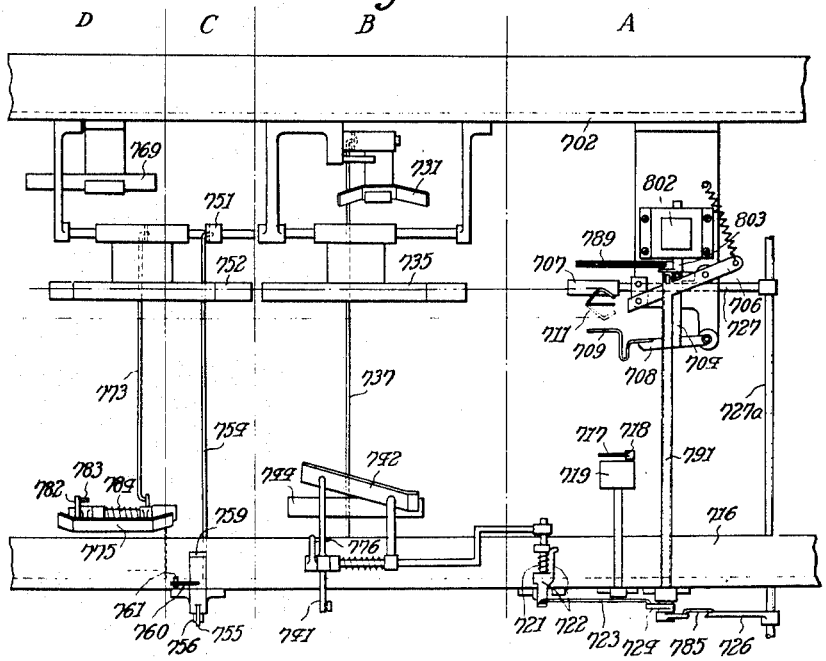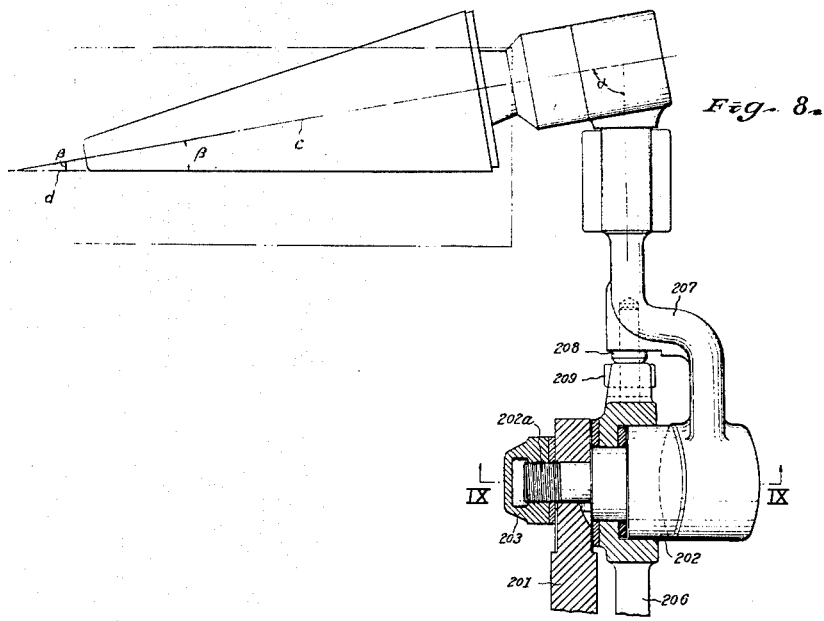

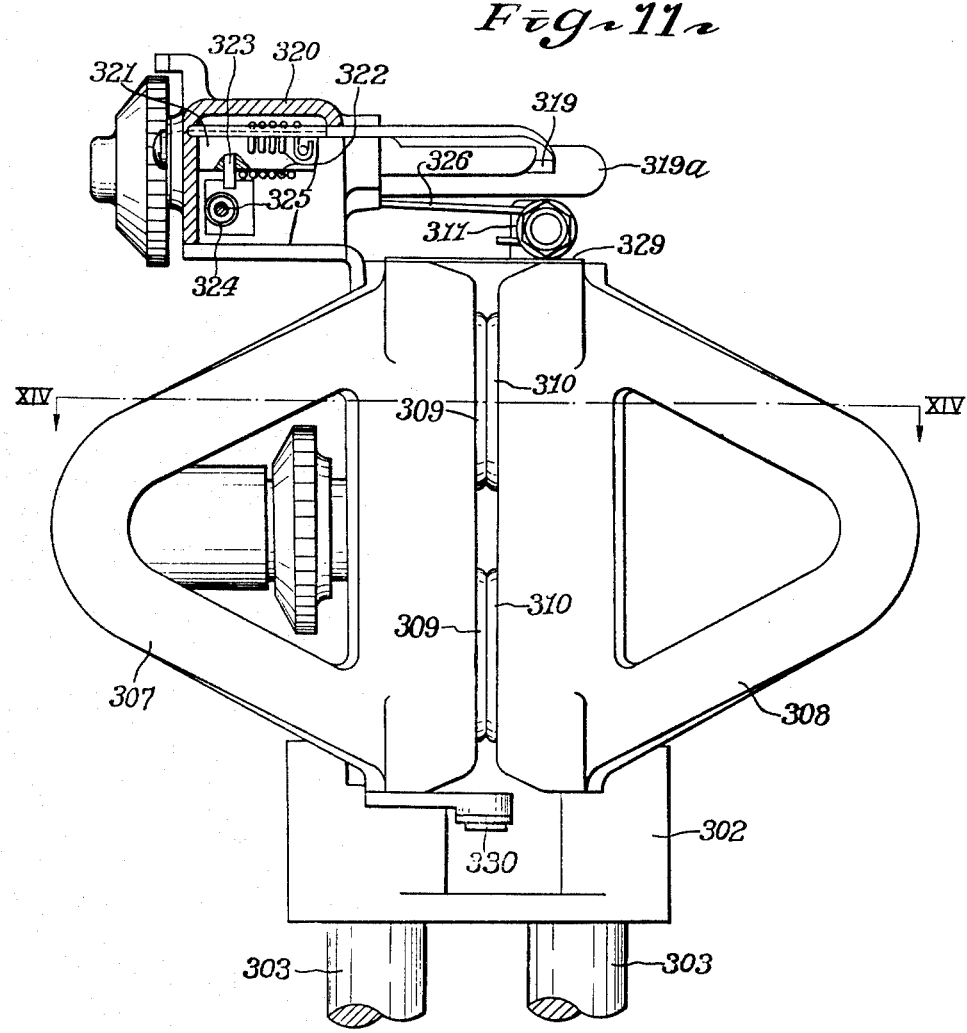

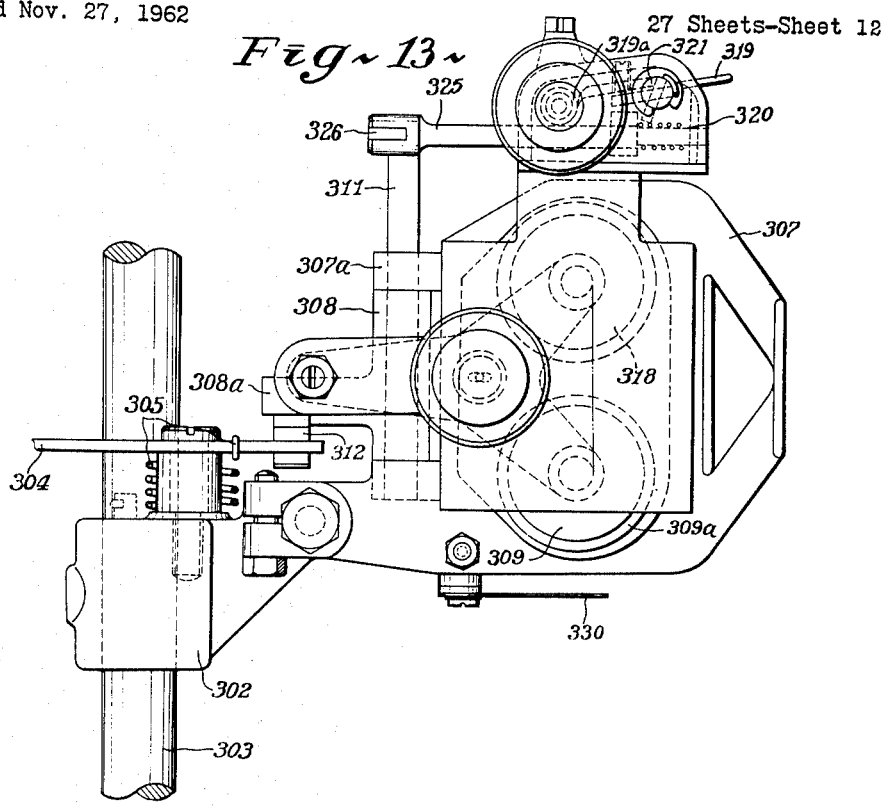

Fig. 15
Fig. 16 PRIOR ART
Fig. 17
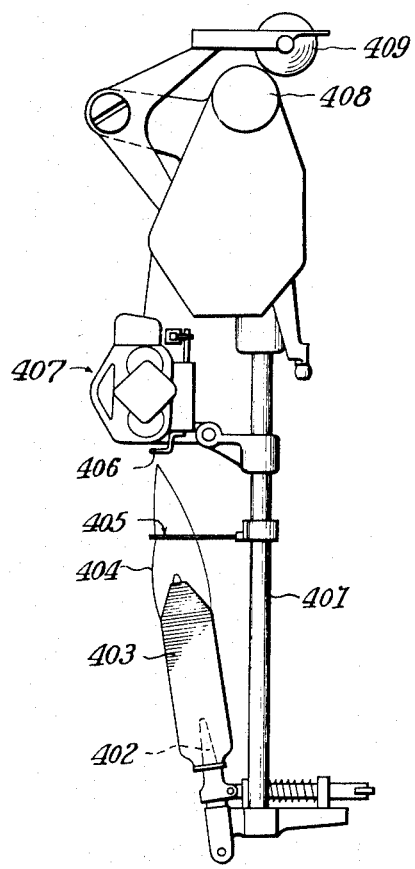
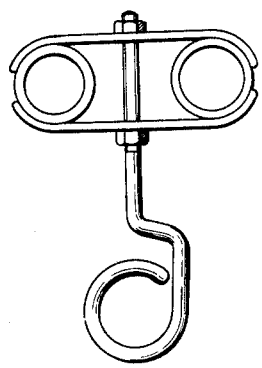
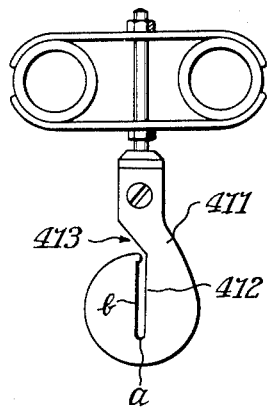

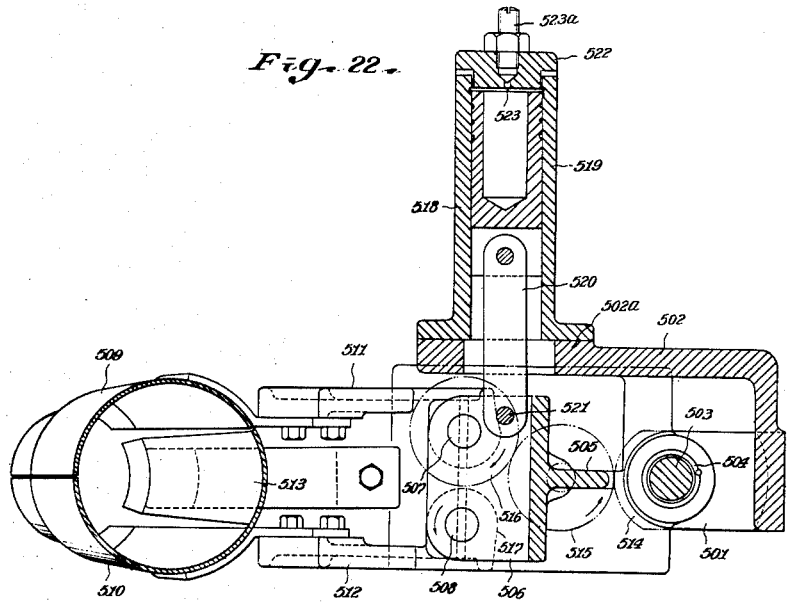
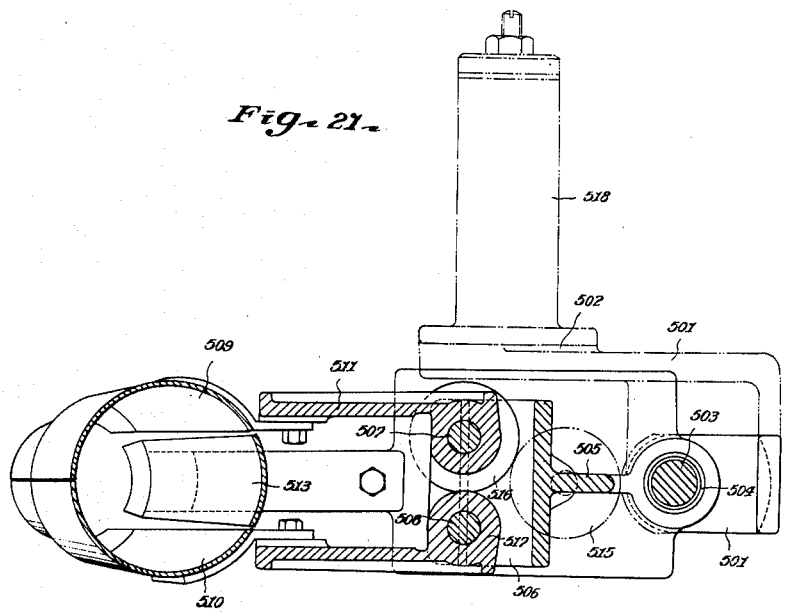

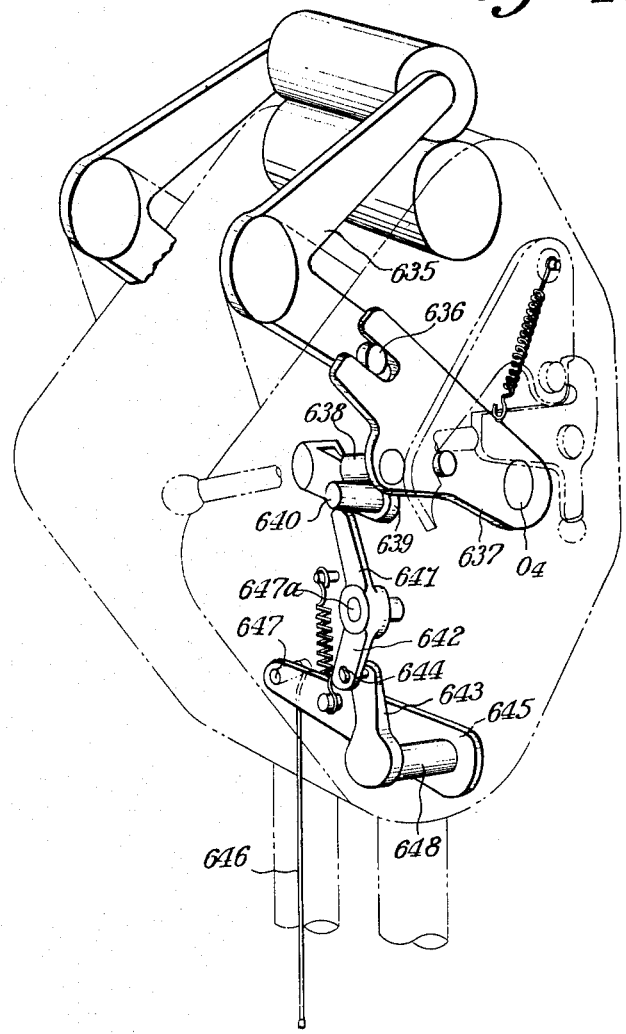

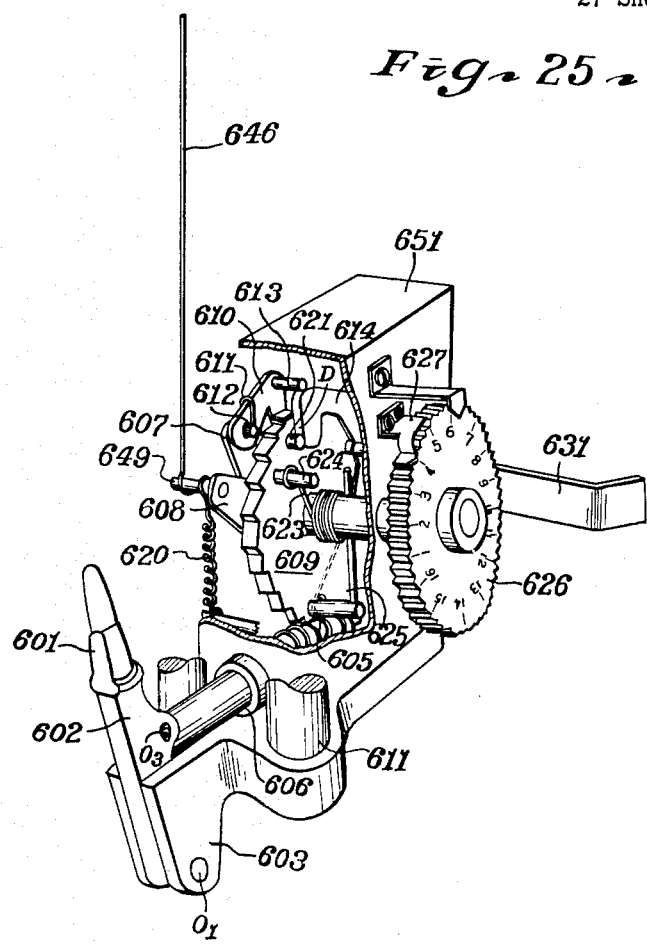

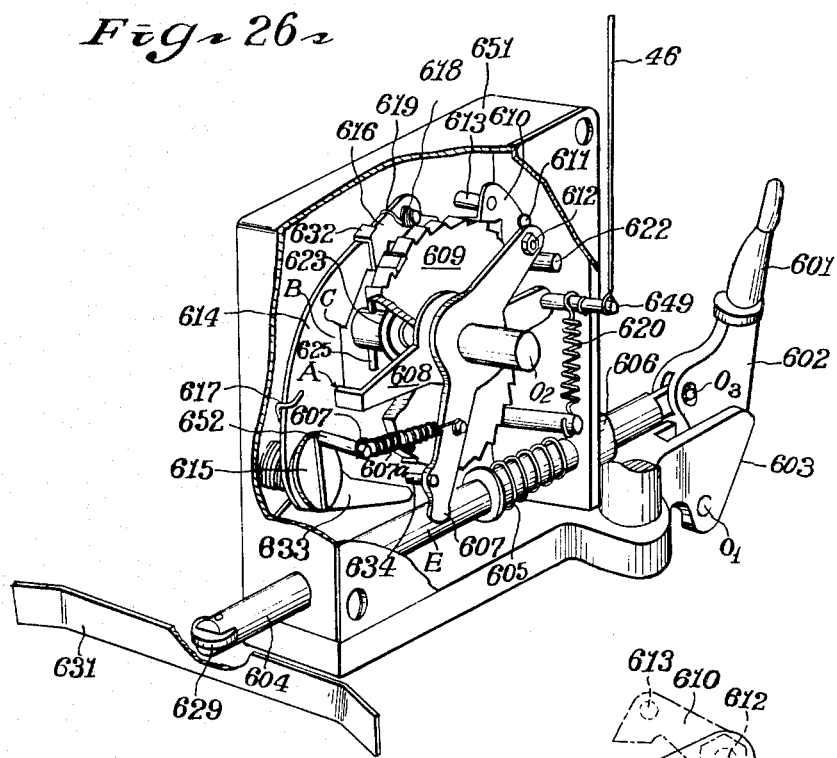
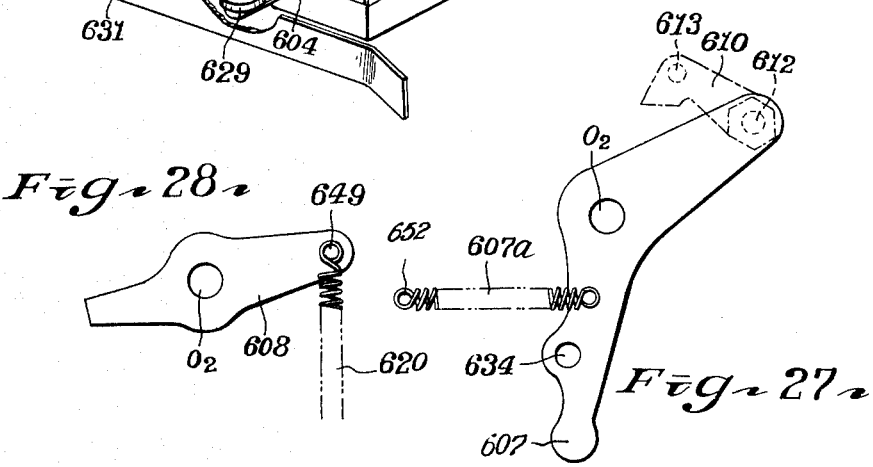

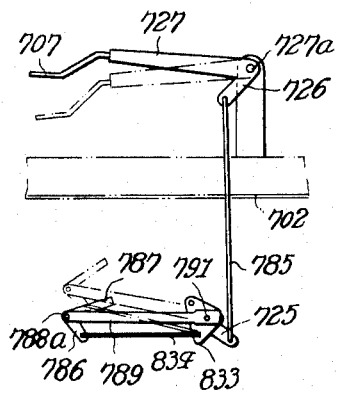
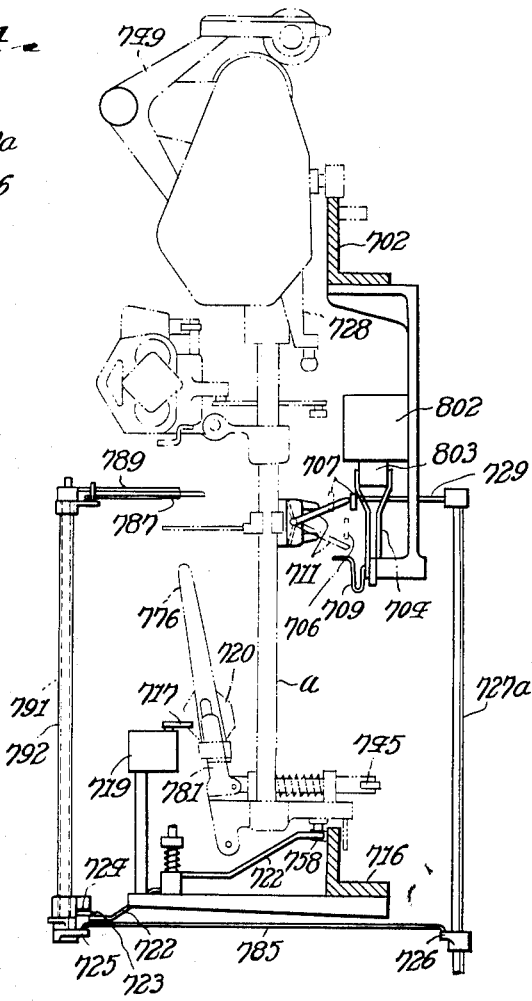

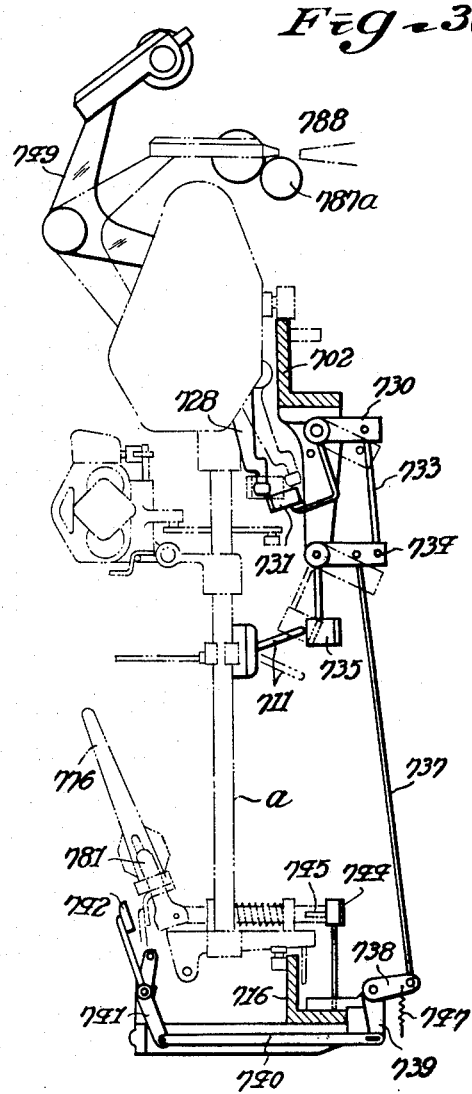

Feb. 22, 1966    KAICHIRO YOSHIDA ETAL    3,236,466
AUTOMATIC WINDER
Filed Nov. 27, 1962    27 Sheets-Sheet 24

United States Patent Office 3,236,466
Patented Feb. 22, 1966

3,236,466
AUTOMATIC WINDER
Kaichiro Yoshida, Sakyo-ku, Kyoto-shi, and Isamu Matsui, Fushimi-ku, Kyoto-shi, Japan, assignors to Murata Kikai Kabushiki Kaisha, Minami-ku, Kyoto-shi, Japan a joint-stock company of Japan
Filed Nov. 27, 1962, Ser. No. 240,292
6 Claims. (Cl. 242—35.5)

This invention relates to certain improvements in automatic winders commonly referred to as Abbott-type winders, that is, the type of automatic winder wherein winding units (hereinafter referred to merely as "unit" or "units") circulate along a circulatory track as they accomplish winding and, at a certain position on the said track, are supplied with new cops.

It is a general object of the present invention to provide new and improved devices or systems listed and briefly described hereinbelow. Particular objects and the nature of the invention, in outline form, will be apparent from these descriptions.

(1) *Cheese- or cone-driving system*

In the conventional Abbott-type winder, the package is driven by direct contact with a driving shaft or roller and rotates as it undergoes sliding motion. Accordingly, the package is subject to severe damage. Moreover, since the traverse-motion mechanism is one wherein a dog is caused to traverse by the rotation of a scroll cam, it has been impossible to wind the package at high speed.

It is, therefor, an object of this invention to solve the above-indicated problems by using an improved rotary drum and driving the package simultaneously as traverse motion is imparted thereto.

However, even the use of a rotary drum still leaves some problems which are difficult to solve. Thus, between the rotary drum installed on each unit or package carrier to drive its package and the drive shaft disposed along the straight-line portion of the annular track or closed path, a counter friction wheel is provided in a selectively contacting and separating manner.

Accordingly, since the driving drum can stop independently in the case of yarn breakage, wrapping of the broken yard end about the driving drum and damage to the wound yarn on the surface of the package due to friction are prevented, and, since the no-load, idle rotation of the driving drum is reduced, wasteful consumption of power is eliminated.

Furthermore, at the time of starting, the counter friction tire or wheel can be introduced gradually between the driving drum and the drive shaft so as to accelerate the package slowly, whereby yarn breakage can be prevented.

A particularly important feature of this driving system is the elimination of so-called ribbon winding. This feature has been achieved by a mechanical arrangement wherein pins are so positioned at suitable intervals on the front of the annular rail of the track that a lever on each circulating unit strikes these pins, whereupon the counter friction wheel is caused to retract intermittently from the drive shaft and the driving drum; when the unit passes beyond the position of a pin, the counter friction wheel is returned to its position of contact with the drive shaft and the driving drum.

Therefore, whenever the driving drum stops or starts abruptly, the rotation of the package on the driving drum is because of inertia slightly retarded relative to the rotation of the driving drum, whereby it is possible to prevent ribbon winding completely.

(2) *Increased taper winding device*

This winder is adapted to wind cheese or cones and is provided with an increased taper winding device which, in the case of cone winding, operates to control the slope of the cone so that, as the package diameter increases, the larger diameter portion progressively becomes larger than the smaller diameter portion and, moreover, to cause the package to move progressively from its position at the start of winding, on the driving drum, to the side of the larger diameter portion. Consequently, the side surface of the package at its smaller diameter portion becomes concave, and that at its larger diameter portion becomes convex.

Accordingly, this package can be made to be easily unwound in the case of its rewinding.

(3) *Cleaner of tension device*

At a suitable point along the circulatory track of this winder, a cam for tensioner cleaning is fixed to the machine frame. At this location, an air nozzle is adapted to face each unit from the outer side of the machine base.

When a unit travels to this position, an arm for actuating the tension device contacts the afore-mentioned cam, whereupon the mutual gap between tension discs of the tension device and the gap of a slub catcher open, and a blast of air is blown into these spaces. Consequently, such undesirable substances as waste and so-called fly and fluffy adhering to the vital parts of the tension device can be completely flown away, and the tension device can be kept clean.

Accordingly, yarn breakage and contamination due to adherence of waste and fly and fluffy are prevented, and, moreover, winding with uniform tension becomes possible, whereby packages of good quality are obtained, and work efficiency is increased.

(4) *Balloon breaker*

As the yarn of a cop is unwound, and the exposed parts of the bobbin becomes larger, a tendency commonly referred to as ballooning occurs with plural nodes, and the yarn in the vicinity of the lower end of the exposed bobbin rubs against or is entwined about the yarn layer surface of the chase of the cop and the exposed part of the bobbin. As a result, yarn breakage occurs, or a phenomenon known as sluffing, in which wound yarn is pulled off from the supply cop in a bunched form, occurs and induces yarn breakage.

The above-mentioned ballooning is prevented in the winder of this invention by a balloon breaker in the form of a balloon guide having a guide hole with a peripheral edge which is not circular but has a shape such as a slit, a polygon, or a multi-ray star. This balloon guide is provided between the cop and the tension device.

Although, when the yarn from the cop is unwound, the centrifugal force acting thereon tends to move this yarn within the guide hole always in the direction of the centrifugal force, and the yarn thereby tends to balloon, the point of contact between the yarn and the said peripheral edge of the balloon guide of this invention is constantly changing since this edge is not circular, whereby ballooning is broken up and prevented.

(5) *Cop-supplying device*

The cop-supplying device of this invention is so adapted that the peg for receiving a new cop dropped from the chute is caused to be tilted, at the time of supplying a new cop, in the direction of the new cop so that the centerlines of the cop and peg coincide, whereby the operation of the chute is rendered positive and accurate. Furthermore, after the new cop has completed its travel down the chute, the chute guide is opened by the continuation of the motions of gears and levers so as not to interfere with the movement of the chute.

(6) Supplied-cop counter

As described briefly above, the cop-supplying device is adapted to tilt the peg toward the chute each time a new cop is to be supplied to the peg. The supplied-cop counter of this invention is adapted to count and memorize the number of times the peg is so tilted.

This counter is so adapted that, by presetting it to the number of cops to be wound, it causes the tilted peg to remain tilted after the selected number of cops have been counted, thereby indicating that the selected number of cops have been wound, and, when the package is doffed and replaced by an empty bobbin core, the counter operates in related motion whereby its reading returns to zero.

When the peg is not tilted, that is, when by-passing takes place as will be described hereinafter, the counter is prevented from counting.

Thus, this suppied cop counter accurately counts the number of wound cops and, when a predetermined number is reached, indicates this state, and since the operator is then to carry out doffing, not only is the yarn length of the cops made to be accurate, but it is also possible to reduce the number of operators for tying.

(7) By-pass device

In an automatic winder of this type, it is desirable that it be so designed that the cop of each unit is fully unwound within the time the unit requires to complete one circuit around the circulatory track. In many cases, however, such a design is not feasible because of such reasons as lack of installation space. Sometimes in such cases, each unit is adapted to be supplied with a new cop every two or more circuits around the circulatory track.

In this case, since each unit circulates back to the cop supply position before the previous cop has been completely unwound, a by-pass device prevents such operations as the removal of the cop, end finding of the yarn from the package, and knotting from being carried out at this time, and causes the unit to by-pass this position, permitting the unit to circulate any number of times until the cop on the unit has been completely unwound.

The details of the invention as well as the manner in which its various objects may best be achieved will be more clearly apparent by reference to the following description when taken in conjunction with the accompanying drawing in which like parts are designated by like reference numerals.

In the drawing:

FIGS. 1 through 7, inclusive pertain to the cheese- or cone-driving system, of which, FIG. 1 is a schematic layout diagram, in plan view, showing the automatic winder of this invention, FIG. 2 is an enlarged side-elevational view showing one part of the package carrier of the winder shown in FIG. 1, FIG. 3 is an enlarged perspective view of the carrier or unit, FIG. 4 is an enlarged frontal view, partly in section and with parts cut away, of the package carrier, FIG. 5 is a side-elevational view, in section, taken along the line V—V of FIG. 4, FIG. 6 is a side-elevational view, in section, taken along the line VI—VI of FIG. 4, FIG. 7 is a side-elevational view, in section, taken along the line VII—VII of FIG. 4, FIGS. 8, 9, and 10 pertain to the improved taper-winding device, of which, FIG. 8 is a plan view, partly in section, showing one part of the taper-winding device, FIG. 9 is an enlarged frontal elevational view in section taken along the line IX—IX of FIG. 8, and FIG. 10 is a side elevational view of the part shown in FIG. 8;

FIGS. 11 through 14, inclusive, pertain to the tension-device cleaner, of which, FIG. 11 is a fragmentary, frontal view of one part of the tension-device cleaner, FIG. 12 is a plan view of the part shown in FIG. 11, FIG. 13 is a side elevational view of the part shown in FIG. 11, and FIG. 14 is a view in section taken along the line XIV—XIV of FIG. 11;

FIGS. 15 through 19, inclusive, relate to a conventional balloon guide and the balloon breaker of this invention, of which, FIG. 15 is a side elevational view indicating the mounting position of the balloon breaker, FIG. 16 is a plan view showing a conventional balloon guide, FIG. 17 is a plan view showing the balloon breaker of the present invention, FIG. 18 is a diagram, in elevational view, indicating ballooning in the case of a conventional balloon guide, and FIG. 19 is a diagram, in elevational view, indicating the ballooning condition in the case of the balloon breaker of this invention;

FIGS. 20 through 23, inclusive, pertain to the cop supplying device, of which,

FIG. 20 is a side-elevational view showing the device which transfers new cops to the pegs of the units, FIG. 21 is a plan view of the device shown in FIG. 20 in section along the line XXI—XXI of FIG. 20, FIG. 22 is a plan view of the device shown in FIG. 20 in section along the line XXII—XXII of FIG. 20, and FIG. 23 is a fragmentary, side-elevational view, partly in section, indicating the installation of the peg; and FIGS. 24 through 31, inclusive, pertain to the supplied cop counter, of which, FIG. 24 is a perspective view, in diagrammatic form with certain parts deleted or cut off for the sake of clarity, of the upper part of the supplied-cop counter as viewed from the right-front direction, FIG. 25 is a perspective view, with parts cut away, showing the lower part of the supplied-cop counter as viewed from the right-front direction, FIG. 26 is a perspective view, with parts cut away, showing the lower part of the supplied-cop counter as viewed from the left-rear direction, FIG. 27 is a side-elevational view of a first lever of the counter, FIG. 28 is a side-elevational view of a second lever of the counter, FIG. 29 is a side-elevational view of a third lever of the counter, FIG. 30 is a side-elevational view of a ratchet wheel of the counter, and FIG. 31 is a side-elevational view of a dial of the counter;

FIGS. 32 through 43, inclusive, pertain to the by-pass device, of which,

FIG. 33 is a front elevational view of the by-pass device,

FIG. 34 is a plan view of the section A of FIG. 33,

FIG. 35 is a side-elevational view of the section A of FIG. 33,

FIG. 36 is a side-elevational view of the section B of FIG. 33,

Figure 44:
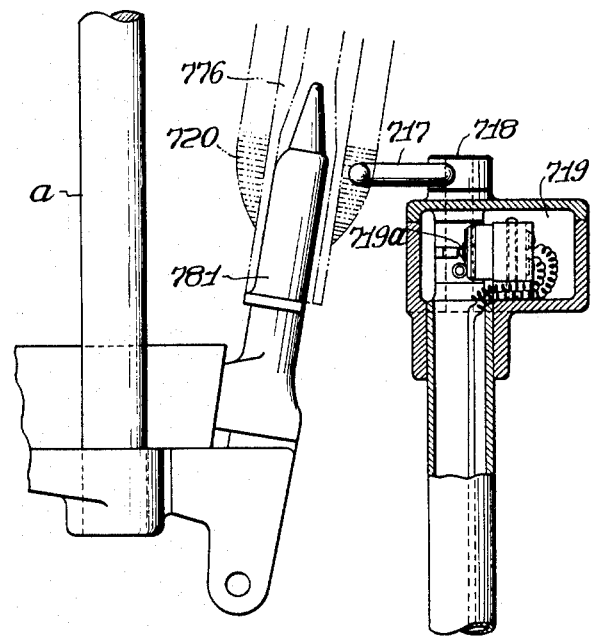
Figure 41:
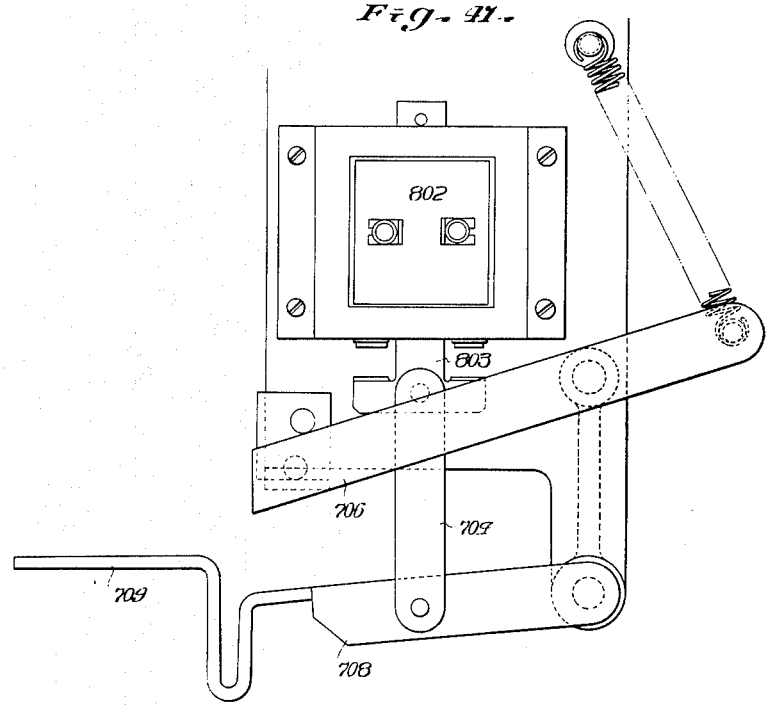
Figure 43:
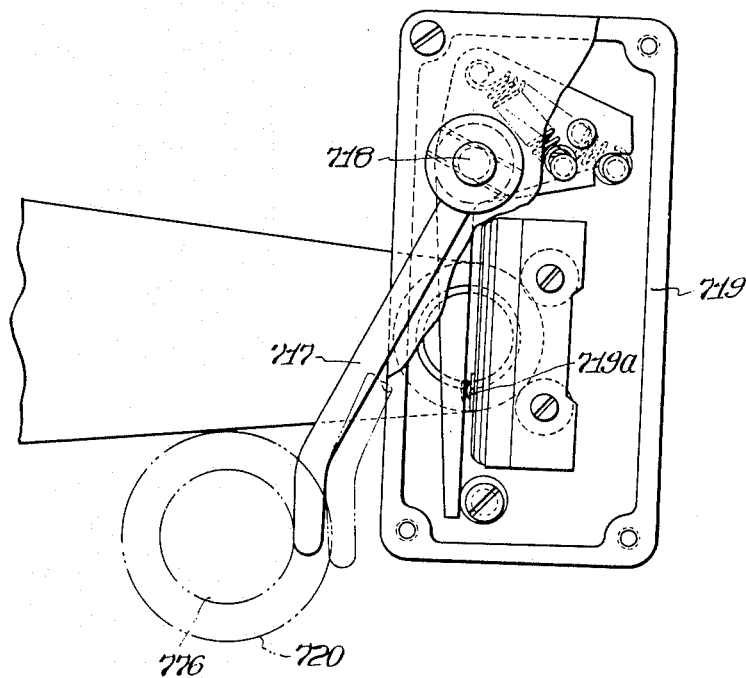
Figure 32:
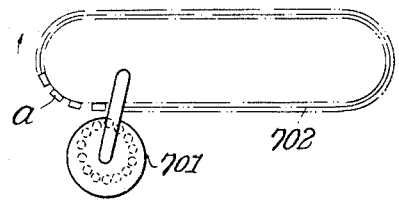
FIG. 32 is a schematic diagram, in plan view, of the automatic winder.
Figure 39:
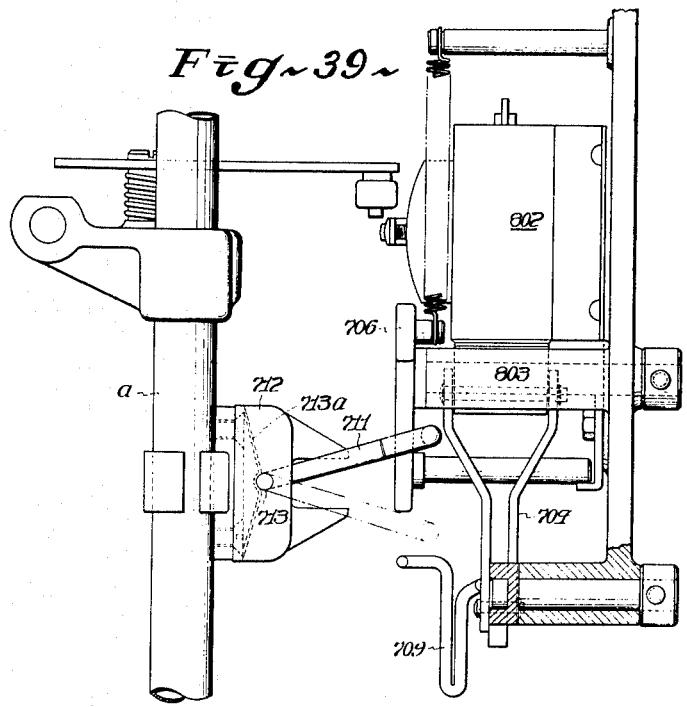
Figure 40:
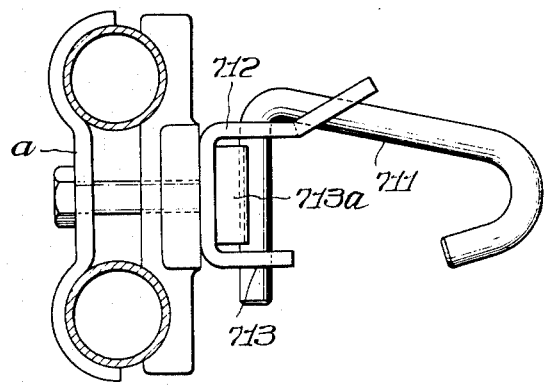
Figures 42, 42A:
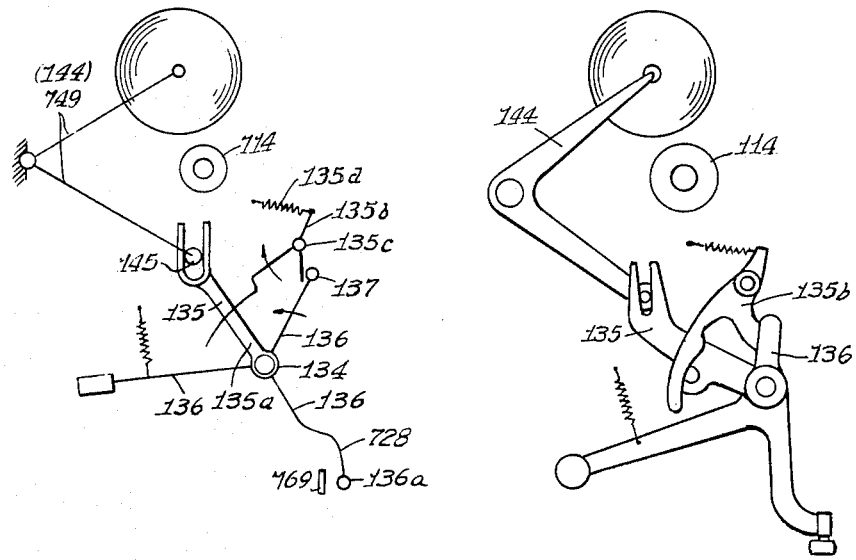

FIG. 39 is a fragmentary side-elevational view showing a part of the section A of FIG. 33, FIG. 40 is a plan view showing a part of the section A of FIG. 33, FIG. 41 is a fragmentary front-elevational view showing one part of the section A of FIG. 33, FIG. 42 is a schematic diagram, in side-elevational view, indicating the operation at the section B of FIG. 33, FIG. 42a is a side-elevational view indicating the operation at section B of FIG. 33, FIG. 43 is a plan view showing one part of the section A in FIG. 33, and FIG. 44 is a side-elevational view, with parts cut away, of the part shown in FIG. 43.

The various items of improvements according to the invention will now be described in detail, item by item, in the order in which they were briefly described hereinbefore.

(1) *Cheese- or cone-driving system*

Referring to FIGS. 1 and 2, the closed circulating track or path is formed, essentially, by upper and lower rails 101 and 102, respectively, on and along which package carriers or units 103 travel in circulatory movement upon displacement generally as described in U.S. Patent No. 2,155,485. Drive shafts 106 are provided above and along the straight-line parts of the track. The circles designated by reference numeral 104 (FIG. 1) represent new cops to be supplied; the yarn ends of each cop and its corresponding cheese are tied by a knotter 105.

The rigid structural part of each package carrier consists principally of a frame 107 and a lower leg 111. Upper and lateral rollers 108 and 109 are rotatably supported on an arm fixed to the rear part of the frame 107 and, together with lateral rollers 112 and 113 rotatably supported on the lower end of the lower leg 111, maintain the unit 103 in an upright attitude and enable it to travel along the rails 101 and 102.

Figure 5:
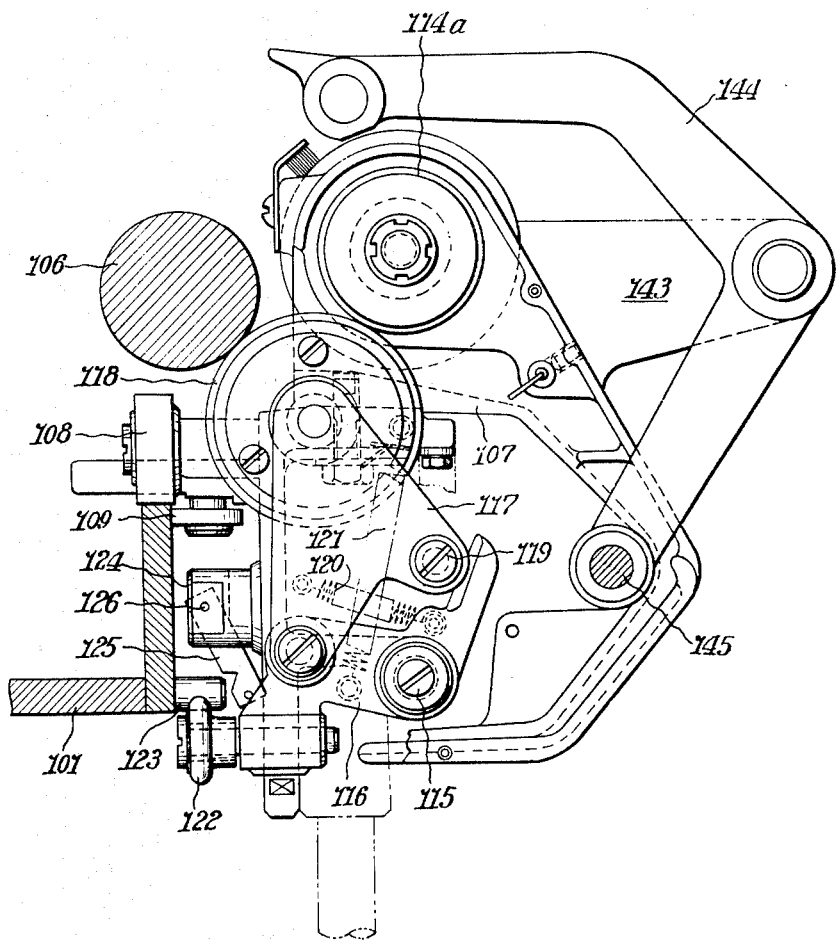

Referring now particularly to FIGS. 4 and 5, it may be seen that a cheese-driving drum 114 is supported rotatably at its ends by bearings (one of which is seen at 114') at the upper part of the frame 107 of each unit. At the lower left part of this frame 107 (FIG. 4), a shaft 115 is rotatably supported by a bearing 110. To the outer end of the shaft 115 is fixed a lever 116, the horizontal arm of which is clamped between a pair of generally triangular plates 117 (FIG. 5). These plates 117 are pivoted at their lower ends, while their upper corners rotatably support a counter friction tire or wheel 118. The front corners (right-hand in FIG. 5) of these plates are provided with a pin 119, which is adapted to confront a vertical arm of the aforesaid lever 116. A spring 120 is stretched between this vertical arm and a part of the frame 107 to apply a force tending to cause the vertical arm to press against the pin 119. However, between the horizontal arm of the lever 116 and a part of the frame, there is stretched a more powerful spring 121 which exerts a greater moment tending to rotate the lever in the direction opposite that of the aforesaid spring 120 and raises a roll 122 supported on the rear end of the horizontal arm of the lever to a position where the roll 122 will strike pins 123 provided at suitable intervals on the lower edge of the rail 101, at the same time causing the counter friction wheel 118 to be pressed against the drive shaft 106 and a friction wheel 114a fixed to the end of the drum shaft.

A rotating shaft 124 extends transversely to the direction of displacement of the carrier on the frame 107 at a level somewhat above the lower edge of the rail 101. At the rear end of this shaft 124, a tumbler 125 is pivoted and suspended by a pin 126 in such a manner that the tumbler can swing in this transverse direction but rotates together with the shaft 124 in movement about the shaft axis. This tumbler 125 is so supported that, when it is in its freely swinging state, it engages with the aforesaid pins 123 as the unit travels. A three-arm lever 127 is fixed to the front end of the shaft 124 and supports on its upper arm a roll 128, which is in contact with the free end of a spring 129 fixed at its other end to the frame 107 and pressing on the roll 128. The left arm (as viewed in FIG. 4) of the lever 127 is provided on its rear side with a roll 130, which contacts a pin 132 supported on the end of an arm 131, which is fixed to the right end (as viewed in FIG. 4) of the aforesaid shaft 115. As shown most clearly in FIGS. 4 and 7, a roll 133 provided at the end of the right-hand arm of the lever 127 is adapted to confront from below a pin 135a supported near the midpoint of a lever 135 pivot at its rear end on a pin 134 fixed to the frame 107. A starting lever 136 is also pivoted on this pin 134 and has a small, upper arm to which a pin 137 is fixed at one end and projects at the other end above the aforesaid lever 135.

As indicated in FIG. 6, an L-shaped detector wire 138 is so pivoted at its bent part on the frame that the tip of one arm is disposed in the path of the yarn 139, and that, at the time of winding, the tip of wire 138 is pressed downwardly by the tension in the yarn; the end of the other arm of the wire 138 is coupled with the upper end of a connecting rod 140, the lower end of which is connected to the upper arm of a lever 141 which is pivoted on the frame. The lower arm of this lever 141 and the lower end of the afore-mentioned tumbler 125 are linked by a connecting wire 142 loosely fitted at its extremities to the tumbler 125 and lever 141 to permit swinging movement of shaft 124 about its axis.

As is known in the prior art, a pair of arms 143 project toward the front from the frame, cradles 144 are pivoted at their middle portions on the front ends of the arms 143, and a cheese-supporting mechanism is provided at the upper ends of these cradles (FIG. 3). The lower ends of these left and right cradles are connected to a coupling shaft 145, which passes through a slot 146 formed on the free end of the afore-mentioned lever 135.

The operation of the cheese- or cone-driving ssytem of the above-described construction will now be described in detail.

During the operation of the winder, the drive shafts 106 are constantly rotating, and the carriers 103 are caused by a separately provided rotating mechanism of the type described in U.S. Patent No. 2,135,485 to travel around the circulatory track in the clockwise direction as viewed in FIG. 1.

Referring to FIGS. 3 and 7, when the yarn 139 is to be wound on a cheese, the operator pushes the front end of the starting lever 136 down, whereupon the pin 137 of this lever pushes the lever 135 downwardly, and the coupling shaft 145 passed through the slot 146 of this lever 135 is shifted downwardly. Accordingly, the cradles 144 are rotated in the counter-clockwise direction as viewed in FIGS. 5, 6, and 7 to press the cheese against the driving drum 114, thereby causing the cheese to rotate and wind up the yarn 139. Since, in this manner, the cheese moves along the track in continuous contact only with the driving drum 114 and not with the drive shaft 106, there is no rubbing between the drive shaft and the yarn as in the case of conventional winders of this type and no consequent possibility of yarn damage or disintegration of the cheese.

If the yarn should break during winding, the reduction in its tension will cause the detecting wire 138 to rotate in the counter-clockwise direction as viewed in FIG. 6. In this case, this movement is transmitted through the connecting rod 140, the lever 141, and the connecting wire 142 to cause the tumbler 125 to drop to the vertical position. Then, as the unit continues its travel for a certain time, the tumbler 125 strikes the pin 123 fixed to the front side of the rail 101 and, together with the three-arm lever 127, rotates in the counter-clockwise direction as viewed in FIG. 4. Accordingly, the roll 130 of the lever 127 pushes the pin 132 downwardly, thereby rotating the shaft 115 through the arm 131. The lever 116, acting through the triangular plate 117, thereby pulls the counter friction wheel 118 downwardly as indicated in FIG. 5, first breaking the contact of the wheel 118 with the drive shaft 106 then breaking its contact with the friction wheel 114a of the driving drum 114 to stop the rotation of the cheese. Then the roll 133 pushes the pin 135a of the lever 135 (FIG. 7) upwardly and raises the coupling shaft 145 engaged in the slot 146 of the lever 135, thereby separating the cheese from the driving drum 114.

When a unit 103 travels toward the left as viewed in FIG. 4, the roll 122 strikes against the pin 123 on the front face of the rail 101 as indicated in FIG. 5 and rotates the lever 116, temporarily pulling down the counter friction type 118 according to the afore-described sequence of actions and causing the driving drum 114 to rotate for a time under momentum. During this time, the rotational speed of the driving drum is lowered slightly from the normal speed so as to prevent ribbon winding.

In the case wherein the drive shaft 106 is long, it is necessary to form this shaft by coupling sections thereof. However, by providing pins or cams (not shown) on the front face of the rail 101 at positions corresponding to the couplings and causing the driving drum 114 to rotate under momentum according to the same sequence as described above when a unit arrives at a coupling of the drive shaft 106, the counter friction wheel 118 can be prevented from being overloaded and damaged, and lowering of the cheese quality can be prevented. Furthermore, for this purpose, it is possible to make the couplings of the drive shaft 106 wide and amply strong.

(2) Increased taper winding device

Figure 9:
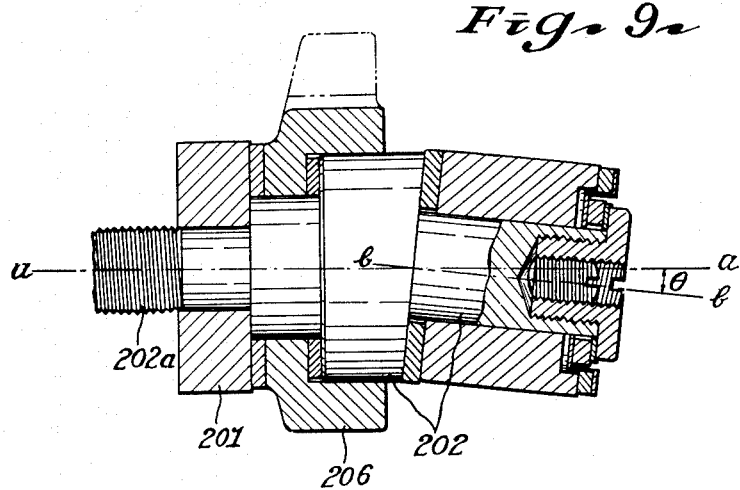
Figure 10:
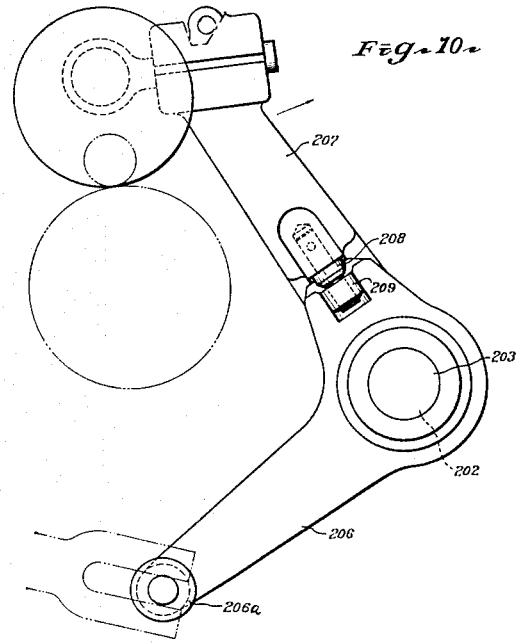
Figure 14:
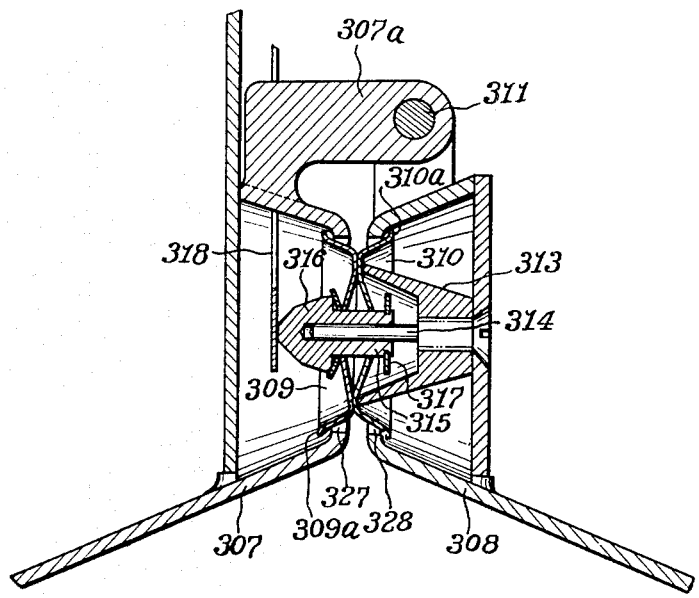

Referring to FIGS. 8, 9, and 10, a pin 202 provided with threads 202a at its end is fastened by means of a cap nut 203 to the single cradle-mounting part 201, which performs a function similar to that of the arms 143 of FIG. 3, of the frame. The pin 202 consists of two parts respectively having an axis a—a and an axis b—b which intersect at an angle $\theta$ as indicated in FIG. 9. Onto the part of the axis a—a is fitted the bent part of a single cradle or one-side lever 206, corresponding to the cradles 144 of FIG. 3, and, which is provided at the end of its lower arm with a roller 206a, which is engaged with a lifter lever in the manner of shaft 145, and is formed in the shape of a fork at its upper end; the lifter lever is illustrated in dot-dash lines in FIG. 10 and performs a function similar to that of lever 135 of FIG. 7. Onto the part of the axis b—b is fitted a cradle arm 207, at one part of which is provided a square slide (movement transmitting member) 209 which is supported by a pin 208 and is engaged with the aforesaid fork-shaped part of the lever 206.

A cone is supported at the upper part of the arm 207 with an orientation (as viewed in FIG. 8) such that the sum of the angle $\alpha$ of intersection of the upper axis of the arm 207 and the cone axis C and the angle $\beta$ of the intersection of the cone axis C and the element or generatrix line $d$ of the cone surface is less than a right angle.

The inclination of the pivotal axis b—b of the arm 207 as indicated in FIG. 9 causes the following winding action. Although, at the time yarn is to be wound about a bare cone bobbin, the bobbin is in a left-hand position relative to the traverse drum, as the wound diameter progressively increases, and the arm 207 rotates toward its erect position, the cone bobbin position progressively moves to the right. Accordingly, as the cone diameter increases, the position at which yarn is being wound moves progressively from the large-diameter part of the cone bobbin toward the small-diameter part, and the cone assumes a conic form with an expanded base.

The determination of the arm 207, the cheese axis C, and the generation line $d$ so as to obtain the relation expressed by $\alpha+\beta<90$ degrees causes the following operation. As the arm 207 rises toward its erect position, the right-hand end of the generatrix line $d$ rises above the left-hand end, and the increase of the yarn layer of the right end (large-diameter side) becomes greater than that of the left end (small-diameter side). Consequently, the intersection of the extension of the generatrix line of the fully-wound cone is always in the vicinity of the same point, and it is possible to obtain a cone such that the resistance due to contact with the surface of the yarn layer at the time of unwinding is substantially constant, regardless of the magnitude of the diameter of the cone. (The traverse is adapted to be slow at the right end and rapid at the left end so as to conform to the degree of increase of the yarn layer, and the hardness is caused to be uniform.)

Such a formation of a cone facilitates the release of yarn at the time of unwinding, and since the possibility of the yarn catching on the lower edge of the cone is eliminated, the work efficiency is greatly increased.

Furthermore, since the arm 207 is adapted to be actuated by the lever 206 which rotates within a plane perpendicular to the traverse drum, that is, perpendicular to the axis a—a, this increased taper winding device is suitable for use in a winder of the travelling unit type.

(3) Tension device cleaner

Referring to FIGS. 11 through 14, the tension device is mounted on a support arm 302 which is fitted onto and supported by vertical shafts 303 of the unit. A bent arm 304 is pivoted on a vertical shaft on this support arm 302, and a spring 305 is provided about the said vertical shaft, one end of this spring being anchored on a pin on the support arm 302, and the other end being connected to this bent arm 304 so as to impart a counter-clockwise moment to this arm, whereby a roll 306 provided on the extreme end of the arm 304 is caused to press against a trapezoid-shaped cam 301 fixed to a suitable part of a cross beam fixed to the machine frame.

Frame plates 307 and 308, formed to open toward the front, respectively support two pairs of tension disks 309 and 310. The frame plate 307 is fitted, at its mounting part 307a, to a shaft 311 and is fixed to the support arm 302. The frame plate 308 is fixed to the shaft 311 and is adapted to swing open in a hinged manner relative to the frame plate 307. The frame plate 308 has a rearwardly projecting arm 308a supporting a roll 312 which is engaged with a U-shaped slot 304a formed on the front end of the bent arm 304.

Within the movable frame, each of two cup-shaped supporters 313 is fixed by a screw 314 between a rigid part of the plate 308 and its corresponding tension disk 310. The tip end of each screw 314 is in the form of a round bar without threads and supports a cylindrical member 315 with an enlarged head, which is loosely fitted onto the said tip end. Onto each cylindrical member 315, the tension disks 309 and 310 are fitted in mutually facing and contacting disposition, and their flanged rims 309a and 310a are adapted to engage with the peripheral edges of circular openings 327 and 328 formed in the frame plates 307 and 308. Each cylindrical member 315 has a collar 317 tightly fitted onto its end on the side of the screw 314. A plate or leaf spring 318 is adapted to press on the enlarged head of each cylindrical member 315 in its axial direction, whereby the tension disks 309 and 310 are caused to be in mutual contact with a suitable contact pressure.

A slub catcher 319 of known type, having an eccentric anvil 319a, is supported by a bracket 320 fixed to the upper part of the side plate of the frame plate 307. This slub catcher 319 has a support shaft 321 about which a spring 322 is provided to impart to the slub catcher a torque tending to turn this slub catcher in the clockwise direction as viewed in FIG. 13. Furthermore, a pin 323 is fixed to this shaft 321 and is pivotally suspended on the bracket 320 in the direction perpendicular to the shaft 321. At the same time, this pin 323 is caused to be always in engagement with a stop collar 324 fixed to a shaft 325 which is so adapted as to engage with the extreme end of a lever 326 fixed to the upper end of the afore-mentioned shaft 311 and be caused to slide axially in the forward and rear directions by the oscillatory motion of the afore-mentioned bent arm 304. By the forward sliding movement of the shaft 325, the slub catcher 319 is caused to rotate in the counterclockwise direction as viewed in FIG. 13, and the clearance between the slub catcher 319 and the eccentric anvil 319a is evidenced simultaneously with the widening of the mutual gap between the tension disks 309 and 310.

In addition, there are provided a yarn lead-in plate 329 which is fixed to frame plate 307 and, moreover, is disposed above the frame plates 307 and 308 and a yarn hook 330 which is provided below the frame plates.

The operation of the above-described device will now be described in detail. When a unit circulates about the circulatory track, and the roll 306 on the extreme end of the bent arm 304 rides onto the trapezoid-shaped cam 301, which is fixed to a suitable point on a cross beam on the machine frame confronting an air nozzle (not shown), the bent arm 304 is caused by the cam 301 to swing in the clockwise direction as viewed in FIG. 12, whereby the roll 312 engaged with the U-shaped slot 304a at the front end of the arm 304 is pushed leftwardly as viewed in FIG. 12. As a result, the movable frame plate 308, which is pivoted on the shaft 311, swings in the counter-clockwise direction and widens the gap between itself and the fixed frame plate 307, and, simultaneously, the tension disk 310, with its flanged rim 310a in engagement with the inner side of the movable frame plate 308, retreats to the position of the collar 317 tightly fitted on the cylindrical member 315 while being continually supported by the end of the supporter 313, thereby widening also the gap between the tension disks 309 and 310. Then a blast of compressed air is blown from the afore-mentioned air nozzle into the widened gaps to clean out and remove fly and fluffy, waste, and other foreign matter adhering to the tension device.

Figure 12:
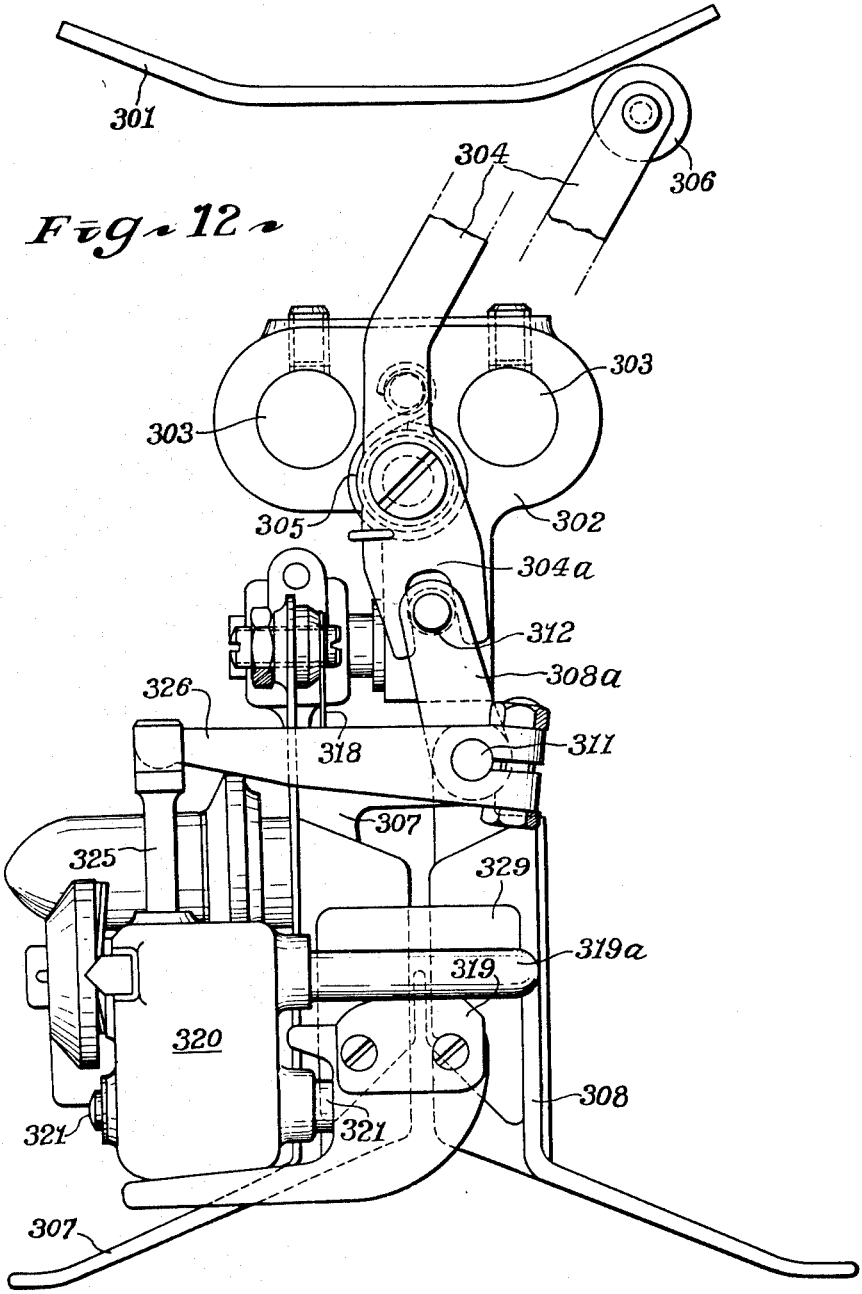

At the same time, the clockwise rotation as viewed in FIG. 12 of the shaft 311 accompanying the widening movement of the frame plate is transmitted through the lever 326 fixed to the shaft 311 to cause the sliding shaft 325 to slide toward the front as viewed in FIG. 12, thereby causing the stop collar 324 to impart a large force on the pin 323 of the support shaft 321. Accordingly, the slub catcher 319 is rotated in the counterclockwise direction as viewed in FIG. 13 to widen the gap between itself and the anvil 319a, whereby knotted yarn, fly and fluffy, waste, etc., adhering to the slub catcher 319 are also blown and removed by the blast of compressed air from the air nozzle at the same time as the cleaning of the tension device.

By the afore-described constructional arrangement and the above-described operation according to the present invention, when each unit arrives at the position of the air nozzle, the bent arm 304 is actuated by the trapezoid-shaped cam 301, whereby the frame plate 308 is opened, and, simultaneously, the gap between the tension disks and the slub catcher gap are also opened to facilitate cleaning by air blast. Accordingly, the principal parts within the tension device where the yarn passes can be thoroughly cleaned. Therefore, lowering of product quality by such defects as yarn breakage due to waste and other matter and development of fluffy due to uneven tension is prevented, and, moreover, production efficiency is increased.

As one possible modification, the shaft 311 of the frame plates 307 and 308 may be shifted either to the left or to the right so as to improve the passage of the air blast, whereby the cleaning efficiency is increased.

(4) *Balloon breaker*

Figure 18:

FIG. 15 is a side elevational view of one example of a winding unit of known type. A cop 403 is positioned on a peg 402 provided at the lower end of the unit frame 401, and the yarn 404 supplied from this cop 403 is passed through balloon guides 405 and 406 and a tension device 407 and is taken upon a cheese or cone 409 which rotates by contact with a rotating member 408. Then, when winding is undertaken, the yarn 404 unwound from the cop 403 is subject to a ballooning phenomenon as indicated in FIG. 15. This ballooning is well known in the art, but as the cop becomes smaller, and the exposed part of the bobbin becomes large, a ballooning having plural nodes as shown in FIG. 18 occurs, and the yarn in the vicinity of the lower end of this part rubs against or wraps around the yarn layer surface at the chase of the cop and the exposed part of the bobbin, whereby yarn breakage occurs, or wound yarn is pulled off in a bunched form, that is, so-called sluffing occurs and induces yarn breakage.

The balloon breaker according to the present invention is installed in the same position as that of the afore-mentioned balloon guides of conventional type but has an outer contour of substantially circular shape except for its shank part 411 for attachment, and a yarn guide hole 412 of a shape other than circular is provided at the center with one part thereof communicating with a yarn lead-in part 413.

Figure 19:
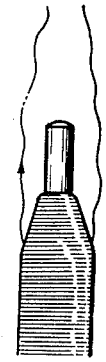

When this balloon breaker is set in the position of the conventional balloon guide, and the yarn is led into the guide hole 412, although the yarn continually tends to move within the guide hole in the direction of the centrifugal force imparted thereto because of the yarn unwinding action and tends to cause ballooning, the position of contact between the yarn and the peripheral edge of the guide hole is constantly circulating as the yarn is unwound. Consequently, the yarn which has moved by centrifugal action in the centrifugal direction (for example, to a position a in FIG. 17) is soon pulled back toward the centripetal direction (to a position b in FIG. 17) and, therefore, does not complete ballooning. As a result, the yarn is caused to describe a corrugated cylinder about, but separated from, the bobbin as indicated in FIG. 19, and since the yarn is thus prevented from rubbing against the yarn layer surface and the exposed part of the bobbin, there is no possibility of sluffing or yarn breakage occurring.

Although the foregoing description has concerned a balloon breaker having a guide hole 412 of a narrow slot shape, other suitable shapes such as a triangle, rectangle, a three-ray star, and a four-ray star may be used. The important point is that the peripheral edge of the guide hole be of a configuration other than circular and be suitable for overcoming the tendency of ballooning to occur.

(5) *Cop supplying device*

One part of the cop supplying device according to this invention is supported on a bracket 501 which has a support arm 502 formed integrally therewith on one side, and which rotatably supports a vertical shaft 503 provided with a spring 504 disposed thereabout and adapted to impart a torque tending to rotate the shaft 503 in the clockwise direction as viewed in FIG. 21. An actuating arm 505 is fixed to the shaft 503 so as to swing integrally therewith, and a fixed gear 514 is provided on the bottom surface of the bracket 501 with the shaft 503 passed this gear 514. On the front face of the actuating arm 505, there are formed brackets 506, on which two vertical shafts 507 and 508 are rotatably supported in mutually parallel, right and left positions. These shafts 507 and 508 are provided with support members 511 and 512 fitted thereon and fixed thereto. These members 511 and 512 support, on their front ends, a pair of opening and closing covers 509 and 510 which are fixed thereto at a certain angle of inclination in the vertical plane from front to rear. Thus, the support members 511 and 512 and, therefore, the covers 509 and 510 are so supported between the brackets 506 that they can swing in hinged manner integrally with the shafts 507 and 508. Between the opening and closing covers 509 and 510, there is provided a fixed guide 513 which is fixed at a certain angle of inclination to the upper part of the actuating arm 505 and to the extreme projecting end of the lower bracket 506 and forms a cop chute chamber together with the afore-mentioned opening and closing covers 509 and 510. A gear 515 is rotatably supported at the lower surface of the actuating arm 505 so as to mesh with the aforementioned gear 514 and, at the same time, to mesh with a gear 516 which is fixed to the lower end of the shaft 507 and is meshed with a gear 517 fixed to the lower end of the shaft 508.

Reference numeral 518 designates the outer cylinder of an air damper fixed to the support arm 502 of the bracket 501. This cylinder 518 is provided therein with a hollow cylindrical piston 519, the inner end of which is pin connected to one end of a piston rod 520, which is loosely fitted at its other end onto a pin 521 which is fixed to the upper surface of the bracket 506. Thus, in accordance with the swinging movement of the actuating arm 505, the piston 519 is cause to move within the cylinder 518. This cylinder is also provided at its outer end with an air damper cap 522 having an air hole 523 which is formed therethrough. An adjusting screw 523a is provided on the outer side of the cap 522 coaxially with the air hole 523 so as to adjustably vary the quantity of air introduced into the cylinder 518.

Figure 23:
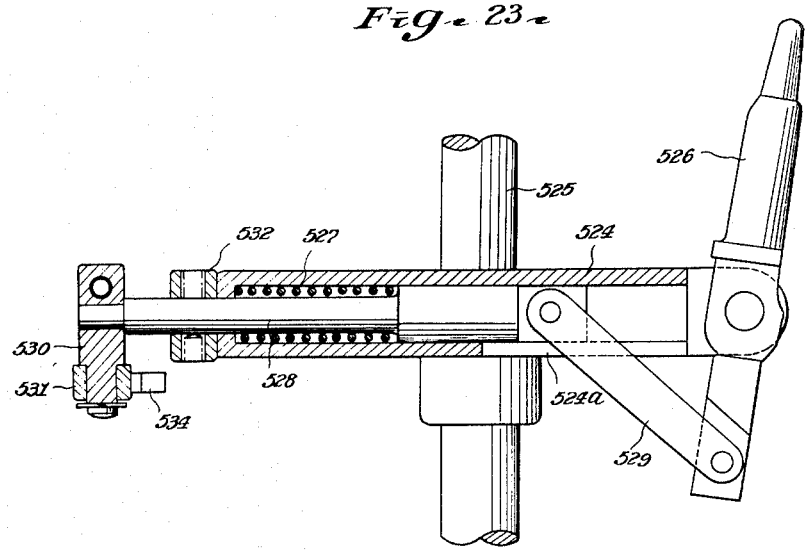

A support arm 524 of hollow cylindrical form, which is supported on a vertical shaft 525 of the unit, has along a portion of its lower surface a slot 524a for permitting the introduction of one end of a link 529, which will be described further hereinafter. A peg 526 is pivotally supported on one end (the right-hand end as viewed in FIG. 23) of the support arm 524. The support arm 524 contains therewithin a sliding shaft 528 and a helical spring 527 which imparts a force on the shaft 528 tending to move it constantly toward its end (toward the right as viewed in FIG. 23). The end of this shaft 528 and the lower end of the peg 526 are linked by the aforementioned link 529 which is pin-connected thereto at its ends. To the other end of the sliding shaft 528 is fixed a roller support member 530 supporting a roller 531. When this roller 531 contacts and presses against a cam 534 fixed in a suitable position on the machine frame of the winder, the sliding shaft 528 is caused to move leftward (as viewed in FIG. 23).

The above-described peg-actuating mechanism is so adapted that the above-said leftward movement of the sliding shaft 528 is transmitted through the link 529 to position the peg 526 at a certain angle of inclination, that is, an angle of inclination such that the peg centerline will coincide with the centerline of a cop falling from the aforementioned cop chute chamber formed by the opening and shutting covers 509 and 510 and the fixed guide 513. This peg inclination angle can be adapted to various cop chute chambers of different inclination angles by suitably selecting the configuration of the cam 534 and the fixed position of a stop collar 532 fixed to the sliding shaft 528.

Figure 20:
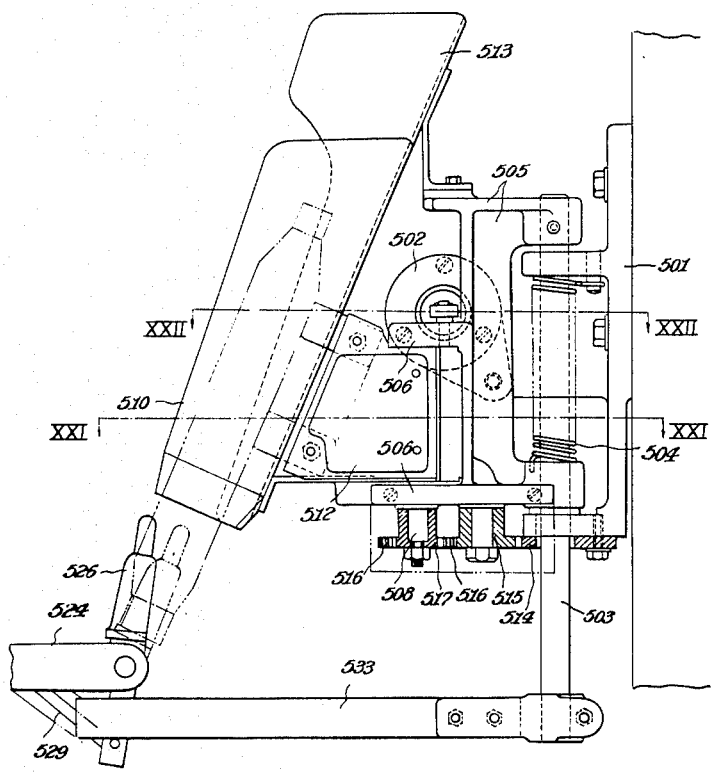

On one hand, as shown in FIG. 20, a lever 533 is fixed at one end to the lower end of the aforementioned vertical shaft 503, and its other end is positioned so as to engage with the lower end of the peg 526 of a unit which is passing thereby.

The cop supplying device of the above construction according to this invention has the following operation. After the yarn end of a cop which has been dropped into a magazine of the automatic winder has been tied by a knotter to the yarn end of a cheese, the cop is supplied by a known means to the chute chamber to be dropped onto the peg of a unit. At this time, the roller 531 is caused to contact the surface of the cam 534 fixed to a suitable point on a cross beam of the machine frame of the winder. By adapting this roller 531 beforehand to move to the right (as viewed in FIG. 23), the sliding shaft 528 which supports this roller 531 on its rear end moves to the left against the force of the spring 521 and, through the link 529, causes the end of the peg 526 to be alined with the direction of drop of the cop and to await the arrival of the cop, which occurs instantaneously, and a cop is fitted onto the peg 526 of the unit.

On one hand, the unit proceeds along the circulatory track to a position below the mechanism shown in FIG. 21, whereupon, simultaneously with the fitting of the cop onto the peg 526 as described above, the lower end of the peg 526 contacts and engages with the lever 533 fixed to the lower end of the shaft 503, causing the shaft 503 to rotate counter-clockwisely as viewed in FIG. 21. Accordingly, since the actuating arm 505 which is fixed to and supported by this shaft 503 is thereby rotated counter-clockwisely, the gear 515 is caused by its engagement with the fixed gear 514 to rotate in the counter-clock-wise direction, whereupon the gear 516 enmeshed with this gear 515 rotates in the clockwise direction, and the gear 517 enmeshed with the gear 516 rotates in the counter-clockwise direction. Consequently, the shafts 507 and 508 which support the gears 516 and 517 also rotate in mutually opposite directions, wherefore the support member 511 is caused by the rotation of the shaft 507 to swing in the clockwise direction, thereby causing the opening and shutting cover 509 supported on the outer end thereof to open. On one hand, the counter-clockwise rotation of the shaft 508 causes the support member 512 to swing in the same direction, thereby causing the opening and shutting cover 510 supported on the outer end of the member 512 to open.

In this case, by making the diameter of the gear 516 larger than that of the gear 517, the gears 516 and 517 are caused to have different angles of rotation, that is, the rotational angle of the gear 517 becomes larger than that of the gear 516. Accordingly, it is possible to cause a difference to exist in the degrees of opening of the opening and shutting covers 509 and 510.

Since the counter-clockwise swing of the lever 533 successively following the instantaneous fitting of a cop onto the peg 526 is caused by the progressive movement of the unit, when the opening and shutting covers 509 and 510 open their front faces (left side as viewed in FIGS. 20 and 21) as described above, and the extreme end of the lever disengages from the peg 526, the shaft 503 is caused by the spring 504 to rotate clockwisely as viewed in FIG. 21, and the gears 515, 516, and 517 rotate in directions respectively opposite to those described above, whereby the covers 509 and 510 are closed, and preparation is made for the following supply operation.

Since the return of the lever 533 to its original position is effected in an extremely abrupt manner by the positive torque in the clockwise direction imparted by the spring 504, the air damper is used to dampen the accompanying return movements of the various parts. That is, since the counter-clockwise swinging motion of the actuating arm 505 causes the pin 521 on the bracket 506 formed integrally with the arm 505 to pull the piston rod 520 toward the base of the air damper cylinder 518, the piston 519 is also moved away from the cylinder head, and the interior of the cylinder 518 is filled with air drawn in through the air hole 523 of the cap 522. Then, during the return operation, the return stroke of the piston 519 is retarded by the said air within the cylinder, and the return motion of the principal moving parts can thereby be dampened.

Thus, in the cop supplying device according to this invention, the inclination of the peg 526 and the direction of drop of the cop, that is, the inclination of the cop chute chamber, are caused to coincide at the time of chuting of the cop toward the peg 526, and the peg is caused to confront the cop on one straight line. Accordingly, the chuting due to gravitational force of the cop toward the peg is accomplished in a positive, accurate manner, and mis-chuting can be completely prevented. Moreover, since the peg is adapted to return to its original upright state after the cop has been securely lodged on the peg 526, the holding of the cop is accomplished in an even more certain manner.

Furthermore, the degrees of opening in a given time of the opening and shutting covers 509 and 510 are caused to be different, by selecting the gears 516 and 517 to have different diameters, so as to cause the cover 510 on the side on which the cop is to be released to open to an ample degree. Accordingly, the separation of the cop from the covers 509 and 510 is facilitated. The closing operation of the covers 509 and 510 is effected after the cop has been positively received by the peg by the separation of the lever 533 from the lower end of the peg 526 with which it has been engaged. During this operation, an air damper operates to dampen the closing motion, whereby damage to various parts due to abrupt closure is prevented.

(6) Supplied cop counter

Referring particularly to FIGS. 25 and 26, the peg 601 is inserted tightly in a peg holder 602 having a pin $O_1$ fixed to the lower end thereof. The two ends of this pin $O_1$ are rotatably supported in holes in a clevis part of a peg bracket 603. One end of a sliding shaft 604 is pin-connected to the peg holder 602 by a pin fixed to the end of the shaft 604 and fitted in a hole $O_3$ in the peg holder 602. The shaft 604 is supported in an axially-slidable manner by a counter case 651 which is fixed on the unit frame. The shaft 604 is constantly pressed toward the left as viewed in FIG. 26 by the force of a spring 605 and is stopped at a suitable position by a collar 606.

On a shaft $O_2$ fitted loosely in holes in the counter case 651 are fitted a lever 607, a lever 608, and a ratchet wheel 609. The lever 607 supports at one end a stud 612 on which is fitted a pawl 610, which is pressed against the ratchet wheel 609 by a spring 611. The lever 607 is provided with a return spring 607a which is stretched between a pin 652 on the case and the lever 607 and imparts a clockwise moment (as viewed in FIGS. 26 and 27) on the lever 607, which is stopped in a suitable position by pin 622 fixed to the case.

Figure 29:
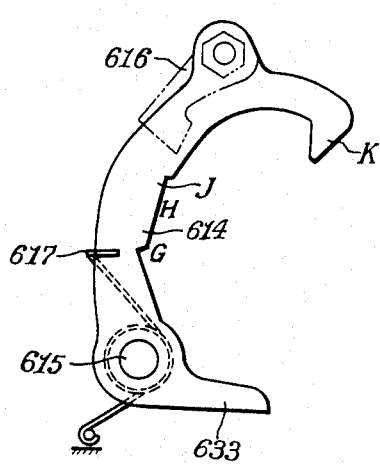

A lever 614 is pivotally fitted onto a stud 615 fixed to the counter case 651, and a force tending to rotate this lever 614 in the clockwise direction as viewed in FIGS. 26 and 29 is imparted thereto by a spring 617 which is also fitted about the stud 615. The lever 614 is provided on one end with a retaining pawl 616 which is held against the ratchet wheel 609 by a spring 619.

A lever 608, which is pivotally fitted onto the shaft $O_2$, is subjected to a force due to a spring 620 tending to rotate it in the clockwise direction as viewed in FIGS. 26 and 28. The end of this lever 608 opposite the spring 620 has a bent tip which is engaged with and stopped by a cut-out part G in the lever 614.

Figure 30:
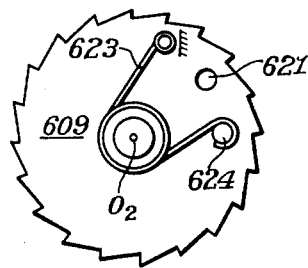
Figure 31:
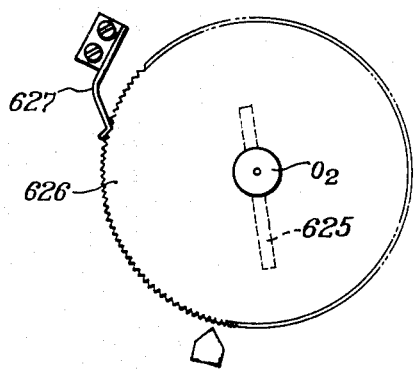

The ratchet wheel 609, which is mounted in a freely rotatable manner on the shaft $O_2$, is provided with pins 621 and 624 (FIG. 30) fixed thereto and a return spring 623. When this spring 623 returns the ratchet wheel clockwisely, the pin 624 contacts a pin 625 embedded in and fixed to the shaft $O_2$, whereby the ratchet wheel is stopped.

As mentioned above, the shaft $O_2$ has fixed thereto near one end the pin 625, and the other end of the shaft $O_2$ extending outside of case supports a dial 626 fixed thereto. The dial 626 and the pin 625 are set in any desired angular position by a spring catch 627.

The operation of the counter device of the above-described construction will now be described in detail.

When a unit, circulating around the circulatory track, completes winding from a cop, the bobbin is doffed for the first time at a point somewhat before the magazine, and successively at the position of the bobbin chute, a cam 631 forces the shaft 604 to move toward the right as viewed in FIG. 26, thereby causing the peg holder 602 and the peg 601 to tilt into position for receiving a new cop as was described hereinbefore. At this time, the lower end of the lever 607 which is engaged with a cut-out part E on the shaft 604 is also moved to the right, and the pawl 610 on the upper end of the lever 607 drives the ratchet wheel 609 through the angle of one ratchet tooth in the counterclockwise direction. After a new cop has been supplied, the cam roller 629 at the tip of the shaft 604 disengages from the cam 631, and the shaft 604 is returned by its return spring 605 to its original position. At the same time, the lever 607 and the pawl 610 are also returned by the return spring 607a to the original position, but the ratchet wheel 609 is retained by the retaining pawl 616 in the position reached after being driven through the angle of one tooth.

Thus, each time a new cop is supplied, the ratchet wheel is driven in one direction by an angle corresponding to one tooth of the ratchet wheel, and the pin 621 fixed to the ratchet wheel is thereby also driven in intermittent motion at the same time. After a certain number of repetitions of this motion, the pin 621 arrives at a point immediately before the inclined surface K at the upper end of the lever 614. When a cop is next supplied, and the ratchet wheel 609 and the pin 621 are rotated by one more tooth, the pin 621 contacts the said surface K and, acting against the force of the spring 617, causes the lever 614 to rotate counter-clockwisely. Consequently, the bent end of the lever 608 disengages from the part G of the lever 614 and, under the force of the spring 620, rotates clockwisely, sliding along the part H and coming to a stop at the cut-out part J of the lever 614.

When the bent end of the lever 608 slides along the part H of the lever 614, the lever 614 rotates further in the counterclockwise direction and, acting on a pin 613 fixed to the pawl 610 and a bent part 632 of the pawl 616, raises these parts in the upward direction, whereby the engagement between the ratchet wheel 609 and pawls 610 and 616 is broken, and the ratchet wheel 609 is rotated by its return spring 623 in the clockwise direction. Accordingly, the pin 624 fixed to the ratchet wheel 609 contacts the pin 625, and the ratchet wheel returns to its original position.

On one hand, the lower arm 633 of the lever 614 is raised to an upward position when the lever 614 rotates counter-clockwisely. After a pin 634 fixed to the lever 607 has been moved to the right, as viewed in FIG. 26, together with the lever 607, the cam roller 629 separates from the cam 631, and the lever 607 is acted upon by the forces of the springs 605 and 607a tending to return it to its original position, but the pin 634 engages with and is stopped by the tip of the raised lower arm 633 of the lever 614. Accordingly, the lever 607 and the shaft 604 are also stopped. Consequently, the peg 601 is prevented from returning and continues to be in its tilted state.

By presetting the pin 625, it is possible to cause the pin 621 to act on the lever 614 at a predetermined number of cycles of operation.

That is, in order to unwind a predetermined number of cops, the pin 625 is so preset that the pin 621 will stop at a position separated retroactively, by an angle determined by the number of teeth of the ratchet wheel corresponding to the predetermined number of cops, from the position at which the pin 621 acts on the inclined surface K of the lever 614. Then, when the predetermined number of cycles have been completed, the peg will remain in its tilted state and not return to its original position, whereupon the operator will discover this state and, together with doffing, will wrap the yarn around a new, empty bobbin, which he will then fit to a cradle 635.

At the end of the other arm of the cradle is fixed a pin 636 engaged with the forked end of a lever 637, which undergoes up-and-down oscillation about an axis $O_4$ in coupled relation to the up-and-down oscillation of the cradle.

A pin 638, which is fixed to the lever 637, is engaged with a pin 640 fixed to an arm 638, which is provided on the upper end of an arm 641 having a pin 647a as its pivot. A lower arm 642, formed integrally with the arm 641, has at its end a hole in which is fitted a pin 644 fixed to the end of an arm 643 rotating freely about a shaft 648. On the other end of the shaft 648 is fixed a lever 645 having at its end a pin 647 fixed thereto. This pin 647 and a pin 649 fixed to the afore-mentioned lever 608 of the counter are linked by a connecting rod 646.

When, upon completion of doffing, the cradle bearing an empty bobbin descends, the arm 637 also descends, lowering the pin 640 of the arm 639. Then the arms 641 and 642 rotate counterclockwisely as viewed in FIG. 24, and the arm 643 connected therewith rotates clockwisely, whereupon the lever 645 which is integrally formed with the arm 643 is raised, and the connecting rod 646 pulls the lever 608 of the counter in the counter-clockwise direction. The bent part of the other end of the lever 608 then leaves the cut-out part J of the lever 614, slides along the part H, and reaches the cut-out part G, whereupon the levers 608 andf 614 become engaged and return to their original state.

(7) By-pass system

Referring to FIG. 33, the position of the section A is before that of the new cop supplying device. When a unit $a$ having residual yarn (yarn still in the process of being wound or residual yarn due to yarn breakage) passes by this position, a finger 711 which consists of a round bar bent into a J shape and, with a hole 713 in a bracket 712 mounted on the unit as a pivot, oscillates within the range indicated by the full line and chain line in FIG. 39, and which is adapted to remain stationary in any desired position through the use of a spring 713a, performs the following function. With the advance of the unit, the finger 711 is first lowered by a finger lowering cam 706 to the chain-line position. Then, as the unit advances further, the residual yarn on the bobbin of the said unit contacts a feeler 717 (FIG. 33). Referring to FIGS. 43 and 44, when the feeler 717, which is a lever rotates clockwisely (as viewed in FIG. 43) about a vertical shaft 718, is pressed against the residual yarn and rotates as indicated by chain line, a button 719a, which is coupled to this feeler, of a microswitch housed within a case 719 is pushed to close a circuit, whereby current flows through a magnet 802, thereby causing a moving core 803 to be drawn upwardly. The core 803, acting through a lever hook 704 and a lever 708, raises a lever 709, thereby lifting the finger 711 to the full-line position. Thus, at this section, the finger 711 of a unit having residual yarn is always lifted to the upwardly directed position, while the fingers 711 of other units having empty bobbins which have completed the winding operation are always placed in the downwardly directed position as indicated by chain line.

When a unit having residual yarn passes by the front of a cam plate 707, the cam plate 707 is caused by the finger 711 to retract from the chain-line position to the full-line position as indicated in FIG. 35, and this movement is transmitted by way of a support lever 727, a shaft 727a, an arm 726, connecting rod 785, an arm 725, and a shaft 791 to a lever 789, whereby a cutter 787 is caused to move from the chain-line position to the full-line position. Thus, during the passage of a unit with residual yarn, the cutter is retracted from the path of the yarn and prevented from cutting the yarn (FIGS. 34 and 35).

Although cam plates 735 and 731, pulled by a spring 747, are in the chain-line positions shown in FIG. 36, when a unit with residual yarn passes by this section B, the cam plate 735 is pressed by the finger 711 to the full-line position. This movement is transmitted by way of a lever 734, a link 737, levers 738 and 739, a link 740 and a lever 741 to a bobbin plow 742, which is thereby caused to retreat from the chain-line position to the full-line position and does not perform doffing. On one hande, the cam plate 731 is also moved from the chain-line position to the full-line position, and, since it does not act upon the starting lever 728, the cradle 749 remains in the raised state, and the winding package does not contact the reverse roller 787a while passing by. Consequently, end finding of the winding package is not carried out (FIG. 36).

At the section C of FIG. 33, a cam plate 752 is provided. When a unit with residual yarn passes by this section, this cam plate 752 is pressed by the upwardly directed finger 711 from the chain-line position to the full-line position, and a lever 759 is caused to descend by a lever 751, a link 754, a lever 755, and a shaft 756. Consequently, during the advance of the unit, the lever 759 is placed in a stationary state without acting upon a guide roll 758 of the unit. Accordingly, the cop supplying magazine is stationary, and a new cop is not supplied. That is, although the cop supplying magazine 786 is mounted on a friction disk and has a tendency to rotate always in the counter-clockwise direction, since a clutch pin 765 is engaged with a stop pin 766 installed below the magazine, the magazine 786 is at rest when the clutch pin 765 is in the full-line position of FIG. 37, and the clutch pin 765 is disengaged from the stop pin 766 when the clutch pin 765 is in the chain-line position, and the magazine starts to move.

When the guide roll 758 of a unit engages with the lever 759 in the chain-line position, the resulting movement of the lever 759 is transmitted through a lever 760, a link 761, a lever 762, and a vertical shaft 763 to rotate a lever 764 and cause the clutch pin 765 fixed to this lever 764 to move to the chain-line position. The magazine 786 rotates and supplies a cop only when the clutch pin 765 is in this position and does not accomplish cop supplying operation when the lever 759 is in the lowered position, that is, when the former bobbin has residual yarn, and the finger 711 is in the full-line position.

During the passage of a unit with residual yarn past this section, the cam plate 752 is pushed by the upwardly directed finger 711 from the chain-line position to the full-line position. This movement is transmitted by a lever 770, a link 773, and a lever 774 to a cam plate 775, which is thereby moved from the chain-line position to the full-line position. Accordingly, since a roller 745 which is coupled by way of a connecting rod to the peg 781 passes by without being acted upon by the cam plate 775, the peg 781 is not tilted and passes by without contacting the chute 778. That is, when some yarn is wound about the bobbin held by unit, the unit merely passes by the various above-described devices, and neither doffing of the bobbin nor the supplying of a new cop is accomplished.

When a unit which has passed by all of these various devices in the above-described manner travels past the curved part of the circulatory track and enters the straight-line part on the opposite side, a cam plate 769 acts upon a lever 728 of the unit and causes the cradle of the unit to be lowered, whereupon the winding operation is resumed.

While a unit travels one or more circuits around the circulatory track, the cop wound about its bobbin is completely wound, and no yarn remains on the bobbin. Then, when this unit arrives at the section A, the feeler 717 does not contact any yarn, and the microswitch within the case 719 remains open. Consequently, the magnet 802 is not magnetized, and the lever 709 does not raise the finger 711. Therefore, this finger 711 does not act upon any of the cam plates 707, 735, 752, and 751 when the unit successively passes by the sections B, C, and D.

At the section A, since the finger 711 does not contact the cam plate 707, the cam plate 707 shown in FIG. 34 remains in the chain-line position, and the lever 789 and the cutter 787 are in the path of the yarn and intercept any residual yarn which arrives. On one hand, a lever 722 is pushed by a guide roll 715 of the unit and rotates, and its movement, transmitted through a link 723, a lever 724, and a shaft 791, causes the lever 789 to rotate from the chain-line position of FIG. 34 toward the direction indicated by full line. Accordingly, the cutter 787, as it pulls out the residual yarn, cuts this yarn by a scissor action between itself and a knife attached to the lower part of the lever 789. The cut yarn is drawn away by a suction pipe (not shown).

When the unit passes by the section B, since the cam plate 735 is not pressed, the lever 734 remains stationary in the chain-line position. Consequently, the bobbin plow 742 remains in its advanced, operating position as indicated by chain line, whereby, when the unit arrives at this position, the lower end of the bobbin rides onto the bobbin plow, and the bobbin is removed from the peg. Since the cam plate 731 is in the chain-line position of FIG. 36, the starting lever 728 is actuated by the cam 731 and passes by this position in a tilted attitude as indicated by chain line. Accordingly, the cradle 749 swing to the chain-line position and contacts the reverse-rotation roll 787a, and the yarn end is drawn by a nozzle 788 and moves to a knotter through a suction pipe.

Figure 37:
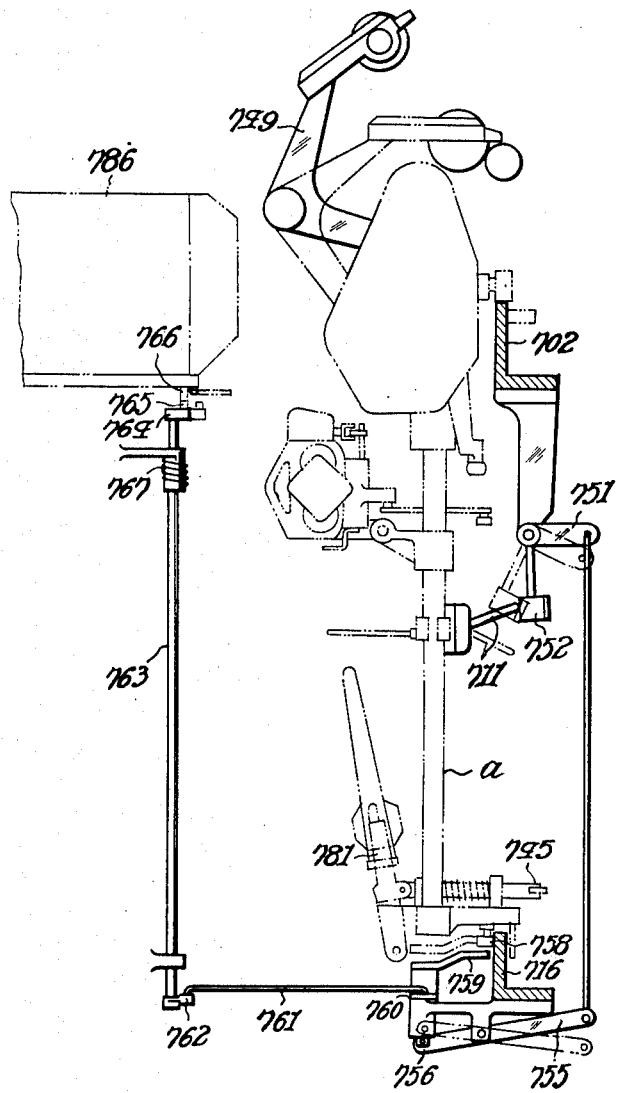
FIG. 37 is a side-elevational view of the section C of FIG. 33.
Figure 38:
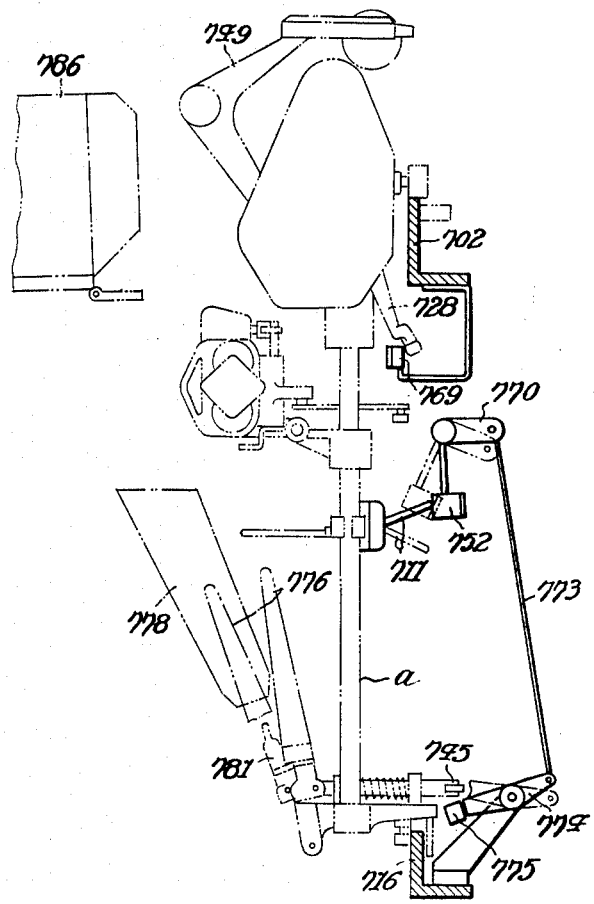
FIG. 38 is a side-elevational view of the section D of FIG. 33.

When the unit passes by the section C, since the lever 759 is raised to the position of the guide roll 758 as is apparent from the chain line in FIG. 37, the lever 759 rotates with the advance of the unit, and this movement is transmitted as described hereinbefore to move the lever 764 to the chain-line position and cause the clutch pin 765 to become disengaged from the stop pin 766, permitting the rotation of the cop supplying magazine. Successively, the yarn ends of the cop and the winding package are tied by a knotting device. Then a cop within the magazine is dropped toward the chute 778.

When the unit passes by the section D, since the finger 711 provided on the unit is in the lowered position as described hereinbefore, it does not contact the cam plate 752, and the cam plate 775 which is coupled by levers and links to the cam plate 752 also is in the chain-line position. Consequently, the roller 745 and the cam plate 775 contact with the advance of the unit and cause the peg 781 to tilt forward to receive the cop falling through the chute 778. At the same time, the cam plate 769 is brought into contact with the roller 136a supported by the tip end of the starting lever 136 (or 728), and with the progression of the unit the roller 136a, i.e. the starting lever 136, is displaced counterclockwise around a pin 134 by the inclined cam surface of the cam plate 769. At the same time as said displacement, a pin 137 fixed at the end of the lever arm unified with the lever 136 urges the lever 135b so as to slightly rotate said lever 135b around a pin 135c in the clockwise direction, thereby releasing the engagement between a pin 135a for maintaining the cradle 144 at its raised position and the lever 135b, whereby the cradle 144 commences to lower owing to its weight and the winding.

Although this invention has been described with respect to a particular embodiment of each of its several aspects, it is not to be so limited as changes and modifications can be made therein which are within the full intended scope of the invention, as defined by the appended claims.

What is claimed is:

1. In a yarn-package-winding apparatus, in combination,
    track means forming a closed transport path;
    at least one yarn-package carrier displaceable along said path, said carrier including support means, cradle means rotatably journaling a generally cylindrical yarn package on said support means for rotation about an axis extending generally in the direction of displacement of said carrier along said path, a drum journaled on said support means for rotation about an axis parallel to that of said package and adapted to contact the latter over substantially the entire axial length thereof for driving said package to wind yarn thereupon, and a driving element frictionally engageable with said drum for rotating same; and
    at least one drive shaft disposed along said path and rotatable about an axis extending generally in the direction of displacement of said carrier and engageable by said element for transferring rotary movement from said shaft to said drum and said yarn package, said track means having a substantially straight stretch and said shaft being disposed along said stretch, said carrier further including mechanism for driving said cradle means and said package away from said drum to disengage said package therefrom, said driving element being a rubber-surfaced wheel rotatable about an axis parallel to the axes of said drum and said yarn package, said carrier further including actuating means having a lever pivoted on said support means and carrying said wheel for intermittently shifting same away from said drum.

2. In a yarn-package-winding apparatus, in combination,
    track means forming a closed transport path;
    at least one yarn-package carrier displaceable along said path, said carrier including support means, cradle means rotatably journaling a yarn package on said support means for rotation about an axis extending generally in the direction of displacement of said carrier along said path, a drum journaled on said support means for rotation about an axis parallel to that of said package and adapted to contact the latter for driving said package to wind yarn thereupon, and a driving element frictionally engageable with said drum for rotating same;
    at least one drive shaft disposed along said path and rotatable about an axis extending generally in the direction of displacement of said carrier and engageable by said element for transferring rotary movement from said shaft to said drum and said yarn package, said track means having a substantially straight stretch and said shaft being disposed along said stretch; and
    mechanism on said carrier for driving said cradle means and said package away from said drum to disengage said package therefrom, said mechanism comprising at least one formation disposed along said track means, a lever mounted upon said support means and journaled for rotation about an axis transverse to said direction, detent means on said support means engageable with said formation in one operative position of said detent means and removed from said formation in another operative position of said detent means for selective engagement with said formation to swing said lever about its axis, means connecting said lever with said cradle means for swinging said package away from said drum, and yarn-breakage-responsive means on said support means operable upon rupture of a yarn supplied to said package to shift said lever from said other position to said one position.

3. The combination defined in claim 2, said carrier further including actuating means for intermittently shifting said driving element away from said drum for permitting free rotation of said drum at spaced locations along said path.

4. The combination defined in claim 3 wherein a plurality of said formations are provided at spaced locations along said track means and said actuating means is disposed in engaging relationship with said formations upon displacement of said carrier along said path.

5. The combination defined in claim 4 wherein said carrier further includes means connecting said lever with said actuating means for disengaging said driving element from said drum upon detection of yarn breakage by said yarn-breakage-responsive means.

6. The combination defined in claim 5 wherein said driving element is a rubber-surfaced wheel rotatable about an axis parallel to the axes of said drum and said yarn package, said actuating means comprising a lever pivoted on said support means and carrying said wheel, said support means being provided with a shaft extending generally transversely to the direction of displacement of said carrier, said detent means being a tumbler swingably mounted on said shaft for displacement transverse to the direction of displacement of said carrier.

References Cited by the Examiner

UNITED STATES PATENTS

| | | | |
|---|---|---|---|
| 1,965,363 | 7/1934 | Abbott | 242—150 |
| 2,040,023 | 5/1936 | Reiners et al. | 242—35.5 |
| 2,129,660 | 9/1938 | Abbott | 242—35.5 |
| 2,157,105 | 5/1939 | Abbott | 242—18 |
| 2,216,725 | 10/1940 | Abbott | 242—35.5 |
| 2,230,992 | 2/1941 | Abbott | 242—35.5 |
| 2,287,012 | 6/1942 | Abbott | 242—18 |
| 2,930,543 | 3/1960 | Goodhue et al. | 242—150 |
| 2,994,491 | 8/1961 | Weber | 242—128 |
| 3,011,736 | 12/1961 | Furst et al. | 242—128 |

FOREIGN PATENTS

| | | |
|---|---|---|
| 852,703 | 10/1960 | Great Britain. |
| 864,648 | 4/1961 | Great Britain. |

MERVIN STEIN, *Primary Examiner*.